US011042592B2

(12) United States Patent
Ryger et al.

(10) Patent No.: US 11,042,592 B2
(45) Date of Patent: *Jun. 22, 2021

(54) METHOD, SYSTEM AND SOFTWARE FOR SEARCHING, IDENTIFYING, RETRIEVING AND PRESENTING ELECTRONIC DOCUMENTS

(71) Applicant: CAMELOT UK BIDCO LIMITED, London (GB)

(72) Inventors: Raphael Shmuel Ryger, Hamden, CT (US); Ekaterina Suvorova, Hamden, CT (US)

(73) Assignee: CAMELOT UK BIDCO LIMITED, London (GB)

( * ) Notice: Subject to any disclaimer, the term of this patent is extended or adjusted under 35 U.S.C. 154(b) by 158 days.

This patent is subject to a terminal disclaimer.

(21) Appl. No.: 16/008,101

(22) Filed: Jun. 14, 2018

(65) Prior Publication Data

US 2018/0293235 A1 Oct. 11, 2018

Related U.S. Application Data

(63) Continuation of application No. 14/673,817, filed on Mar. 30, 2015, now Pat. No. 10,031,913.

(Continued)

(51) Int. Cl.
*G06F 16/00* (2019.01)
*G06F 16/93* (2019.01)
(Continued)

(52) U.S. Cl.
CPC ........ *G06F 16/93* (2019.01); *G06F 16/24578* (2019.01); *G06F 16/3334* (2019.01); *G06F 16/9535* (2019.01)

(58) Field of Classification Search
CPC ........... G06F 16/24578; G06F 16/3334; G06F 16/93; G06F 16/9535; G06F 16/3337; G06F 40/55; G06F 40/58
(Continued)

(56) References Cited

U.S. PATENT DOCUMENTS 6,363,374 B1 3/2002 Corston-Oliver et al.
6,381,598 B1 * 4/2002 Williamowski ........ G06F 40/55
704/1

(Continued)

OTHER PUBLICATIONS

International Search Report, PCT/US2015/023435, dated Aug. 12, 2015.
(Continued)

*Primary Examiner* — Vincent F Boccio
(74) *Attorney, Agent, or Firm* — Oblon, McClelland, Maier & Neustadt, L.L.P.

(57) ABSTRACT

The present invention provides a method and system for identifying, retrieving and presenting electronic documents responsive to user queries. The three distinct inventive concepts are relevancy ranking of responsive documents based on component query technique; cross-lingual searching; and search expansion using analytics of initial results to derive and generate a modified query. Each of these inventions enhances document search and retrieval systems and the three solutions may be used separately or in any combination. The three inventions apply in layers above an underlying search system, controlling the submission of requests to the underlying system in support of received search requests, typically originating with an end user. Invention (III) provides a semantic-expansion capability specifically utilizing the availability of language independent fields in the data being searched with natural language query terms. This invention is enhanced by incorporating the preceding two inventions.

21 Claims, 17 Drawing Sheets

Related U.S. Application Data

(60) Provisional application No. 61/972,300, filed on Mar. 29, 2014, provisional application No. 61/972,272, filed on Mar. 29, 2014.

(51) Int. Cl.
*G06F 16/33* (2019.01)
*G06F 16/9535* (2019.01)
*G06F 16/2457* (2019.01)

(58) Field of Classification Search
USPC .......................................................... 707/708
See application file for complete search history.

(56) References Cited

U.S. PATENT DOCUMENTS

| | | | |
|---|---|---|---|
| 7,680,778 B2 * | 3/2010 | Middha | G06F 16/3322 707/999.003 |
| 8,135,575 B1 | 3/2012 | Dean | |
| 8,359,309 B1 | 2/2013 | Provine et al. | |
| 8,594,994 B1 | 11/2013 | Dean | |
| 8,868,591 B1 * | 10/2014 | Finkelstein | G06F 16/3322 707/767 |
| 9,971,771 B2 * | 5/2018 | Ryger | G06F 16/9535 |
| 10,031,913 B2 * | 7/2018 | Ryger | G06F 16/3334 |
| 2002/0023091 A1 | 2/2002 | Silberberg et al. | |
| 2003/0167252 A1 | 4/2003 | Odom et al. | |
| 2004/0064438 A1 | 4/2004 | Kostoff | |
| 2005/0097092 A1 | 5/2005 | Annau et al. | |
| 2005/0256865 A1 | 11/2005 | Ma et al. | |
| 2006/0190447 A1 | 8/2006 | Harmon et al. | |
| 2006/0294100 A1 | 12/2006 | Meyerzon et al. | |
| 2007/0073894 A1 | 3/2007 | Erickson et al. | |
| 2007/0129935 A1 | 6/2007 | Uchimoto et al. | |
| 2007/0244882 A1 | 10/2007 | Cha et al. | |
| 2008/0177717 A1 * | 7/2008 | Kumar | G06F 16/3322 |
| 2009/0125497 A1 | 5/2009 | Jiang et al. | |
| 2009/0198674 A1 | 8/2009 | Custis et al. | |
| 2010/0185670 A1 | 7/2010 | Krishnan et al. | |
| 2011/0161309 A1 | 6/2011 | Lung et al. | |
| 2011/0231411 A1 * | 9/2011 | Shein | G06F 16/355 707/749 |
| 2011/0302172 A1 | 12/2011 | Chandrasekar et al. | |
| 2012/0095984 A1 | 4/2012 | Wren-Hilton et al. | |
| 2012/0271828 A1 | 10/2012 | Raghunath | |
| 2013/0226954 A1 | 8/2013 | Lukez et al. | |
| 2015/0193486 A1 | 7/2015 | Moataz et al. | |
| 2015/0310005 A1 | 10/2015 | Ryger et al. | |
| 2015/0310114 A1 | 10/2015 | Ryger et al. | |

OTHER PUBLICATIONS

Written Opinion of the International Searching Authority, PCT/US2015/023435, dated Aug. 12, 2015.
International Search Report, PCT/US2015/023429, dated Jul. 7, 2015.
Written Opinion of the International Searching Authority, PCT/US2015/023429, dated Jul. 7, 2015.
International Search Report, PCT/US2015/023431, dated Jul. 13, 2015.
Written Opinion of the International Searching Authority, PCT/US2015/023431, dated Jul. 13, 2015.

* cited by examiner

201A

[atherosclerose]

202A

176 ATHEROSCLEROSIS
38 TRANSFER PROTEIN
37 TREATING ATHEROSCLEROSIS
26 ANTI ATHEROSCLEROSIS
21 SCAVENGER RECEPTOR ANTAGONISTS
21 RALOXIFENE
21 MACROPHAGE SCAVENGER RECEPTOR ANTAGONISTS
21 ATHEROSCLEROSIS CORONARY HEART DISEASE
16 ABCA
11 THERAPEUTIC ANTI ATHEROSCLEROSIS
11 PROPHYLACTIC AND THERAPEUTIC ANTI ATHEROSCLEROSIS
11 PHYTOFLUENE
11 PHYTOENE
11 PHENYL BENZOTHIOPHENE CPD.
11 OXIDN. BY ADMIN.
11 LDL OXIDN. BY ADMIN.
11 KILLED BY EXTENDED FREEZE DRYING
11 FIBRILLIN
11 EXTENDED FREEZE DRYING
11 DERIVS.
11 CPD.
11 BENZOTHIOPHENE CPD.
11 ADMIN.
11 CORONARY HEART DISEASE
8 IMMUNE COMPLEXES
8 ELASTIN
8 RESTENOSIS
...

203A

443 RESTENOSIS
36 ATHEROSCLEROSIS
30 PREVENTION OF RESTENOSIS
28 PREVENTING RESTENOSIS
23 TREATING RESTENOSIS
18 STENT
17 VASCULAR RESTENOSIS
16 INHIBITORS
14 DERIVATIVES
12 INHIBITING RESTENOSIS
12 PSORIASIS
12 PREVENT RESTENOSIS
11 TREATING
11 ANGIOPLASTY
11 COMPOUNDS
11 ARTHRITIS
10 ENDOVASCULAR STENT
...

FIGURE 2A

METHOD, SYSTEM AND SOFTWARE FOR SEARCHING, IDENTIFYING, RETRIEVING AND PRESENTING ELECTRONIC DOCUMENTS

CROSS-REFERENCE TO RELATED APPLICATIONS

This application is based upon and claims benefit of priority from U.S. application Ser. No. 14/673,817, filed Mar. 30, 2015, entitled IMPROVED METHOD, SYSTEM AND SOFTWARE FOR SEARCHING, IDENTIFYING, RETRIEVING AND PRESENTING ELECTRONIC DOCUMENTS, which claims benefit of priority from U.S. Provisional Application 61/972,300, filed Mar. 29, 2014 entitled IMPROVED METHOD, SYSTEM AND SOFTWARE FOR SEARCHING, IDENTIFYING, RETRIEVING AND PRESENTING ELECTRONIC DOCUMENTS and U.S. Provisional Application 61/972,272, filed Mar. 29, 2014, entitled IMPROVED METHOD, SYSTEM AND SOFTWARE FOR SEARCHING, IDENTIFYING, RETREIVING AND PRESENTING ELECTRONIC DOCUMENTS, the contents of each of which are incorporated herein by reference in their entirety.

FIELD OF THE INVENTION

The present invention relates generally to information-retrieval systems and more particularly to query-processing components and methods and to augmenting (expanding) search terms, processing search terms and determining relevancy of terms within documents and relevance of documents to the search terms and augmented search terms and organizing and yielding useful search results to a user.

BACKGROUND OF THE INVENTION

The volume of information available today in many domains precludes exhaustive inspection. Even when attempting to restrict attention to sub-domains of interest, academic and industrial researchers and developers cannot give attention to the constant deluge of new documents published. In this context, automated search services are essential.

Search systems typically perform two roles. One is the provision of information via the documents they present to users. Another is the demonstration that the presented documents are the documents that contain the desired information. The popular Google search system is used primarily in the first of these roles. Its users want certain information. Once delivered, by presenting the "best" documents for the purpose, as ranked by known and proprietary methods, the possible existence of other documents providing similar information, perhaps using different terminology or in different languages, drops to marginal importance. On the other hand, intellectual-property lawyers doing prior-art searches are not interested just in the information contained in patent documents. It is their job not to miss any document that is sufficiently related in its content to the concern at hand, despite its information possibly being couched in different verbiage or using nonstandard or erroneous spellings, and even if some documents of very similar content have already been identified. Whereas a Google user typically looks no further than the first ten or twenty returned results, a patent prior-art searcher may individually inspect (to some depth) hundreds of results from a single search.

When using a search system in the second of these roles, the user has had to balance two strategies, one favoring "recall," i.e., minimizing the search misses, the documents of interest not identified in the search results; and the second favoring "precision," i.e., minimizing the false hits, documents identified in the search results that are not actually of interest. Recall is essential in that there may be significant adverse repercussions to having missed a relevant document. On the other hand, precision is essential simply in that at some stage of the workflow human resources begin to be required to evaluate the documents obtained, and human resources are limited. It is not efficient to squander them on documents that are not relevant, if only the screening out of these irrelevant documents could be automated via the search system itself.

The sophisticated search systems operating against patent, academic, and legal literature, and other such large corpora regularly accessed by the respective professionals, offer a host of operators including score-propagating versions of the Boolean (logical) sentential connectives. Professional users make extensive use of the Boolean operators as they navigate between the goals of recall and precision. To favor recall, the user amplifies search queries with additional clauses connected by the Boolean OR operator, these clauses attempting to account for different languages, terminologies within each language, grammatical forms, and variant spellings and frequent misspellings. Each such clause has the potential of pulling in its own set of unrelated results along with the otherwise unretrieved desired results it was intended to capture. That is, each OR-ed clause intended to improve recall threatens precision. Conversely, the user can favor precision by amplifying search queries with additional clauses connected by the Boolean AND (or, equivalently, BUTNOT) operator. Of course, such clauses, while enhancing precision, threaten recall.

In fact, in iteratively applying patch after patch to their search queries to attend either to recall or to precision, patent searchers have tended to accrue queries of hundreds of search terms. It takes a long time to develop such queries, and they are exceedingly difficult to maintain. This presents a significant and persistent problem in need of a solution.

Moreover, as communication and geographic, virtual and physical, boundaries are increasingly blurred or non-existent, people with different native languages increasingly become undifferentiated—at least in terms of goals, interests and jurisdiction. One area of particular difficulty is in enabling a wide and divergent and multi-national population of users to effectively identify and retrieve information of interest across an ever expanding universe of documents including content in multiple languages. In the area of patents, for one example, tens of millions of granted patents and patent applications have been published by the patent offices of the U.S., European Patent Organization (EPO), Japan, France, Germany, United Kingdom, and many other countries. In addition to patent publications from the numerous jurisdictions, the number of research papers and technical and other journals that are being published, and hence are in need of effective search access, continues to grow. A growing problem with regards to patent searching, technical research paper searching, etc., is that many geographically and linguistically diverse people are brought together legally and by interest. While this is, of course, a benefit to society, the linguistic diversity of documents, in addition to their sheer aggregate volume, poses a problem for intelligent access to the documents and for the technologies intended to support such access. In addition to issued patents and pending patent applications in numerous jurisdictions, the number of published research papers and technical and other journals that are now available for searching and reviewing continuous to grow.

In the context of the patent domain, the U.S. Patent Office uses a subject matter-based classification system to place submitted patent applications in technology centers, classes, and sub-classes of art to more efficiently handle the searching and granting, or denying, of patent claims. In addition a set of International Patent Classification ("IPC") further classifies patents and applications by subject matter. Historically, examiners assigned to examine patent applications would consult "shoes," i.e., boxes each associated with a particular sub-class and containing collections of patents grouped together based on subject matter disclosed and claimed by previous inventors. Prior to electronic searching examiners would consult by hand the shoes in an effort to find prior art, this was very tedious, time-consuming, and inefficient. Electronic databases effectively place patent documents in electronic "shoes" for searching and both governmental and proprietary systems attach keyword-dense fields to patents.

In many areas and industries, including the financial, accountancy, and legal sectors and scholarly, institutional, and corporate research and other areas of technology and development, for example, there are content and enhanced experience providers, such as The Thomson Reuters Corporation. Such providers provide repositories of content, and guidance materials and other resources to assist users in their respective field of interest. Such providers help identify, collect, analyze and process key data for use in generating content, such as law related reports, research papers, financial analysis and data products, articles, etc., for consumption by professionals and others involved in the respective industries, e.g., lawyers, accountants, researchers, professors, financial analysts, etc. Providers in the various sectors and industries continually look for products and services to provide subscribers, clients and other customers and for ways to distinguish their firms over the competition. Such providers strive to create enhanced tools, including search and ranking tools, to enable clients to more efficiently and effectively process information and make informed decisions.

For example, with advancements in technology and sophisticated approaches to searching across vast amounts of data and documents, e.g., database of issued patents, published patent applications, etc., professionals and other users increasingly rely on mathematical models and algorithms to enhance the delivery of professional services, e.g., to enhance search and retrieval of documents of interest responsive to a user input set of query terms. Existing methods for applying search terms across large databases of documents, for example patent documents, have room for considerable improvement as they frequently do not adequately focus on the key information of interest to yield a focused and well ranked set of documents to most closely match the searcher's intent as expressed by the entered search terms.

Prior efforts to enhance searching include Thomson Reuters' Results Plus function, which is in part implemented in Westlaw-based services and as disclosed in U.S. patent application Ser. No. 11/028,476, the disclosure of which is incorporated herein in the entirety. In terms of the Intellectual Property and patent area, Thomson Reuters' patent claims analyzer function, as disclosed in U.S. application Ser. No. 12/658,165, the disclosure of which is incorporated herein in the entirety, discloses a system for applying natural language processing on patents and pending applications. In addition, concept searching techniques are disclosed in U.S. Pat. No. 8,321,425 (Custis et al.), the disclosure of which is incorporated herein in the entirety; T. Custis and K. Al-Kofahi. A new approach for evaluating query expansion: Query-document term mismatch. In *Proc. of the* 30*th Annual International ACM SIGIR Conference on Research and Development in Information Retrieval*, pages 575-582. ACM, 2007; and T. Custis and K. Al-Kofahi. Investigating external corpus and clickthrough statistics for query expansion in the legal do¬main. In *Proc. of the* 17*th Conference on Information and Knowledge Management* (*CIKM*), pages 1363-1364. ACM, 2008 (referred to collectively herein as "Custis-Al-Kofahi")

Compared to existing methods, what is needed are systems that provide: 1) easier expression of the searcher's interest, including automatic accommodation of different languages of search-term entry, the responsive documents to be found independent of language and of intra-language linguistic variants; 2) smarter determination of the searcher's narrower and broader area(s) of interest; and 3) improved relevance ranking to enable the searcher to decide how far afield to go from the documents most narrowly focused on the expressed area of interest—which documents should be accumulated right at the top of returned search results.

SUMMARY OF THE INVENTION

The present inventions address the professional needs just described, promoting hand-in-hand broadening of recall and improvement of relevance ranking They do so without intervening in the internal functioning of the underlying search system and without building and maintaining auxiliary indexing infrastructures. Rather, they involve enhancements at the level of the search controller, the computer-implemented dispatcher of requests to the underlying search servers, whereby additional intermediate requests are issued and their results analyzed, the crafting of these additional requests being automated by the computer-implemented search controller in accordance with an understanding of the properties of the structured data in the corpus being searched, as will be detailed.

Discussed herein are three distinct inventions (I, II, and III) directed to providing improved methods and systems for identifying, retrieving and presenting electronic documents responsive to user queries. The three distinct inventions are I—relevance ranking of responsive documents based on a technique of focus-spectrum expansion of a search query into component queries; II—cross-lingual search term suggestion; and III—semantic search using analytics of initial results to derive and numerically calibrate an expanded query. Each of these inventions enhances document search and retrieval systems and the three solutions may be used separately or in any combination.

The key is to recast the problems as discussed above in the Background. First of all, we must recognize that relevance to a search query is not a binary property. While one could postulate a reference set purporting to contain exactly the relevant documents responsive to a user query, the notion that there is such an absolute set in any meaningful sense is but a fiction and convenient in allowing certain analyses in information-retrieval theory. Realistically, individual users have different needs and different intentions in formulating their queries, and so what is relevant for one user submitting a search query might not be relevant for another user—or for the same user on a different occasion—submitting the very same query. A less simplistic, if still simplistic, notion is that relevance is on a continuum, such that any particular occasion of submission of a query has an associated threshold of relevance to which only the user is privy, but relative to which any consideration of recall and precision must be made. This is still simplistic in that it presumes that a single "true" relevance ranking would obtain for all users submitting the query, and only their threshold of relevance for desired inclusion in the search results would vary. It significantly refines the usual model in information-retrieval theoretic discussion of recall and relevance, wherein various measures are proposed to quantify the quality of delivered rankings of returned results relative to (absolute, non-fuzzy) reference sets of the relevant documents, while "correlation measures" evaluating delivered rankings with respect to reference rankings are given much less attention. The remaining weakness of this presumption of a common "true" relevance ranking, however, is most evident when a query involves a single search term that is common to two or more unrelated areas of technology. A result set, let alone a relevance ranking of the results, meeting the expectations of a user who has one of the divergent senses of the term in mind cannot be suitable for a user who submits the same query with another sense of the term in mind.

Imperfect though it is, the conceptual framework of user-dependent thresholds of desired inclusion among search results along a single relevance continuum, for any submitted query, shifts the focus away from concern over precision and strongly toward improvement of ranking by relevance. With good relevance ranking, the stakes in including many barely relevant or even irrelevant results far down the ranking are low. The user spot-checks down the ranking of results, discovers that relevance to the query drops off consistently the farther down she explores, and decides at some point down the ranking that interest has thinned out to the point that the remainder of the results may safely be ignored. While different users might mark that cutoff point differently, none should be adversely affected in their work by the presence of the trailing documents considered dispensable.

A comparison with existing approaches to search in Web services such as Google's is instructive. Google, from its outset, has viewed the useful ranking of its returned Web pages as a primary design goal. Typically for users of such systems the broadest recall is not critical. However, for certain groups of professionals, casting a broader net so as to insure that no pertinent document is missed can be much more important, as for patent professionals when searching for prior art. In stark distinction to typical Google use, standard practice for these patent professionals, as for similar recall-oriented professionals, whether searching for legal precedents or for germs of a scientific insight in the academic literature, has been to perform multiple iterations of partial inspection of search results followed by query modification until the search results comprise a seeming fully satisfactory set of documents to be considered individually, skipping none. Of course, if all records of the final result set are to be inspected, relevance ranking of those final results is not essential. But this standard practice entails a very laborious and time consuming iterative process. Furthermore, even after all the time and effort, there remains a danger that documents will have been missed due to linguistic, terminological, grammatical, or orthographic variation not accounted for in the query, despite all its rounds of editing.

Clearly, there is an opportunity to economize greatly in the investment required of such professional users by shifting the onus to the search service. A two-pronged approach is called for. On one hand, the search service must provide mechanisms to get past the limitations of pattern matching against the particular search terms entered by the user. The service must be able to cast a wide net that reaches past the many natural-language barriers threatening the quality of recall with respect to the user's intention. But, on the other hand, the likely attendant loss of precision must be compensated for by a significantly improved capability of ranking results by relevance. The present inventions represent progress on both these fronts.

The challenge of getting past the linguistic barriers is a familiar one. Dictionaries may be consulted to find equivalent terms in other languages. Thesauri may aid with alternate terminologies and semantically related words within a language. The WordNet project of the Cognitive Science Laboratory at Princeton University is a particularly ambitious effort to map the lexical space of English with respect to meaning. See WordNet: A lexical database for english. http://wordnet.princeton.edu/. There are parallel projects for other languages. But dictionaries and thesauri compiled for general or even subject-specific use, but without reference to the particular corpus being searched, may be out of touch with the optimal choices of search terms for targeting the patterns of language use within the corpus. An approach that delivers thesaurus functionality driven by the corpus to be searched itself is so-called latent semantic indexing, or LSI. This involves creation and maintenance of an index infrastructure auxiliary to the search system that informs it and against which its output is to serve. In its straightforward use, LSI does not help with finding semantic relatives across languages, a necessary service which we aim to provide, among others, through the inventions here disclosed.

Custis and Al-Kofahi, e.g., in U.S. Pat. No. 8,321,425 B2, address many similar concerns, and their query-expansion approach is somewhat related to the present cross-lingual search-term suggestion. The following highlights some significant differences. Custis-Al-Kofahi rely on the frequency of co-occurrence of pairs of terms within "windows" of a certain size—i.e., co-occurrence within some count of words—in the documents of a large, separate corpus of relatively short and relatively uniform documents to quantify the semantic "closeness" of potential query-expansion terms to a given query term.

The present invention instead assumes that the data in the corpus being searched are structured and include at least one field and possibly—and preferably—more fields known to be short and keyword-dense, obviating maintenance of separate frequency tables for pairs of terms, and ensuring that our term suggestions are effective as search terms against the very corpus to be searched. Custis-Al-Kofahi do not advocate actually adding semantically close terms to the keyword query, to be processed through the inverted index. Rather, they do a virtual expansion of the query by incorporating the semantic closeness of other terms into their document scoring formula, which, without shortcuts, is computationally expensive, looping over all terms of each document to be scored. Shortcuts they propose restrict attention to terms found prominent either through pseudo relevance feedback starting with the original query or through associations to the original query terms derived from processing of click-through data. We, on the other hand, as will be seen, take advantage of the short, keyword-dense fields in the structured data to analyze a random sampling of thousands of records, giving us term suggestions which we either display to the user for interactive query expansion or use to expand the query behind the scenes for the phase-two and phase-three searches in the more extensive semantic expansion of our invention (III), the expanded query in all cases to be processed by the generic underlying search system with its native scoring. The result, we argue, is much simpler to deploy and maintain, and should be more efficient to run as well, justifying the present disclosure. It should be recognized that the Custis-Al-Kofahi approach will work and ours will not if the data are unstructured; but, as they make clear, an approach based on co-occurrence of terms in windows of running text cannot bridge the gap between languages, as the present inventions are expressly designed to do. Hence, the Custis-Al-Kofahi proposal and ours are best viewed as similar in flavor but complementary in their optimal application.

One more point is in order regarding the Custis-Al-Kofahi approach to (monolingual) semantic expansion in comparison with the present inventions. While, of what we present here, our invention (II) is closest to their proposal, we do not regard this component or intend it, in itself, as accomplishing adequate semantic expansion. Rather, invention (II) bridges linguistic gaps to afford invention (III), which exploits additional fields, a broader set of "seed" terms for the pseudo relevance feedback used in its semantic expansion. The powerful interactive term suggestion enabled by invention (II), which usefully offers as many as 100 scored suggestions per input term, emerges as a side benefit of its function in providing cross-lingual support to invention (III); but in the latter role we take care to use no more than a few of the top terms suggested, to keep the subsequent pseudo relevance feedback analysis from going too far afield. In a monolingual setting, invention (II) could conceivably not even be deployed at all for the semantic expansion of invention (III) to perform well. So behind the contrasts highlighted in the preceding paragraph is a difference in the role played by term expansion in the two approaches toward the goal of semantic expansion. Thus, the here-proposed distinctive allocation of responsibility among the present complex of inventions is at the heart of their novelty.

I—Relevance Ranking Using Focus-Spectrum Expansion Component Queries

Further with respect to the first invention, an improved relevance ranker is directed to presenting a user with documents identified and ranked in better accordance with their degree of focus on the interest behind the user's search request. One problem with prior systems ranking documents responsive to a query is that they generally rank documents based on their aggregate number of occurrences of the one or more search terms explicitly present in the user's input search query. Many categories or types of documents today include fields, metadata, and discrete sections common to all documents contained in a related collection or repository of similar documents. For example, in the context of patents, electronic patent documents are maintained in multiple proprietary and public databases and each patent contained in such databases includes well-known fields directed to specific information of or about the patent, e.g., title, claims, abstract, specification, background, references cited, etc. When searching such databases, prior systems fail to intuit relevance or to distinguish the relative significance of search-term occurrences based on where the terms are found in the responsive document, e.g., in a particular field or section of the document. While users may manually search specific fields and not others, prior systems do not attempt to rank responsive documents across all fields using a relevance ranking method. The inventors have found benefit in recognizing and automatically exploiting the known correlation between the degree of relevance of a document and the fields or sections of a document in which terms occur.

In one manner, improved relevance ranking is accomplished by using a set of focus-spectrum component queries to provide a relevance ranking dependent upon the number and type of fields in which a search term appears. Unlike the prior art (which ranks search results based upon the number of times a search term appears in the respective results documents indiscriminant of area of a document), the present invention employs a focus-spectrum search expansion and from that determines relevance scoring or ranking in part based on particular fields in which search terms appear. For example, in a current search for patents in Thomson Innovation, a first document wherein a search term appears ten times in the detailed description would receive a higher ranking than a second document wherein the search term appears once in the title, twice in the abstract, five times in the detailed description and once in the claims. This is because the first document contains the search term ten times and the second document contains the search term nine times. However, under implementations of the improved relevance ranking proposed here, based on advantageous use of focus-spectrum component queries, the second document would receive a higher ranking due to the multiplicity of fields and/or the particular fields in which the search term appears. For example, if a bias toward multiplicity of term-containing fields is implemented by multiplication of the aggregate term-occurrence count across all fields by the square of the number of fields which have occurrences of the term, the first document would have a relevance score of $10*1^2=10$, whereas the second document would have a relevance score of $9*4^2=144$, and the second document would be ranked ahead of the first.

II—Search Term Selection/Suggestion and Cross-Lingual Searching

With respect to the second invention disclosed herein, the invention enables cross-lingual searching and results in response to a user-entered set of terms. This is accomplished by, e.g., providing a searcher entering a non-English search term with English search options selected from a term frequency table generated for documents containing both the non-English search term and English metadata. In another manner, the invention receives English terms and performs a search expansion process by identifying additional terms likely to lead to search results of interest. In both instances the suggested search terms may be included automatically or presented to the user for selecting/deselecting via user interface. Natural language processing/information retrieval and searching techniques have proven to be more effective in the English language. Accordingly, even a native Japanese speaker wishing to search for patent documents of interest may benefit from first converting search terms entered in Japanese into English and searching a database of English language terms representing some or all of an original Japanese document, e.g., English translations of abstract and/or claims of Japanese patent. Another example is the German language. A German searcher searching German documents can, e.g., access Derwent fields or other English resources and avoid slow performance and possible "truncation overflow" associated with double-sided wildcards often needed on German terms.

In one manner, the cross-lingual invention assumes that the data in the corpus being searched are structured and include at least one field and possibly—and preferably—more fields known to be short and keyword-dense. This improves over prior systems by obviating maintenance of separate frequency tables for pairs of terms, and ensuring that term suggestions are effective as search terms against the very corpus to be searched. The invention preferably utilizes existing short, keyword-dense fields in the structured data to analyze a random sampling of records to generate term suggestions which may be either displayed to the user for interactive query expansion or automatically used to expand the query behind the scenes for the phase-two and phase-three searches in the more extensive semantic expansion/query modification invention. The expanded query is then processed by the generic underlying search system with its native scoring. Cross-lingual term expansion bridges linguistic gaps to afford the semantic expansion invention, which exploits additional fields, a broader set of "seed" terms for the pseudo-relevance feedback used in semantic expansion. The powerful interactive term suggestion enabled by cross-lingual term suggestion, which, e.g., usefully offers as many as 100 scored suggestions per input term, emerges as a side benefit of its function in providing cross-lingual support to semantic expansion. In this latter role preferably no more than a few of the top terms suggested, to keep the subsequent pseudo-relevance feedback analysis from expanding too far afield. In a monolingual setting, cross-lingual term expansion may be deselected or not used at all for semantic expansion to perform well.

More particularly, the cross-lingual invention provides a system and method for generating cross-lingual suggestions for new search terms in a particular "target" language L_0, ranked in order of likely usefulness, given a single-word or multiword search term in some "source" language L, which may or may not be the same as language L_0. It is recognized that English language in many respects affords a more effective language for searching content as compared to other languages. Certain services provide English versions of documents or fields of documents including keywords related to non-English content contained in the documents/ section/field. The invention is useful not only for native English-speaking users to search non-English originating or source documents, also to assist non-English speakers in searching databases using the more search-friendly English language. In the present invention, language L is represented across a broad range of subject matter in short, keyword-dense text fields in the corpus being searched; and a substantial portion of the records with such fields in language L also have short, content-rich or keyword-dense text fields in language L_0. The cross-lingual solution is without regard to local or remote dictionary or translation service or to grammatical analysis. Further, a text-term search is performed for the source term in the short, keyword-dense fields of the entire corpus—either irrespective of language, if the source language has not been specified, or only in fields of the specified source language. The results of the text-term search are analyzed in respect of the occurrence frequencies of word phrases in the short, keyword-dense text fields that are specifically in language L_0. The raw occurrence frequencies for the obtained sample are variably discounted based on background frequencies in the corpus as a whole to get resultant scores, which are normalized for display as a sorted, scored series of search-term suggestions.

III—Search Expansion Using Analytics of Initial Results and Query Modification

With respect to the third invention disclosed herein, in response to a user entered query the invention provides a set of final document set of "hits" to the user/searcher wherein some of the documents are not directly responsive to the user query. Thus, this may be thought of as query expansion. However, unlike the art in this area, the additional documents contained in the set of final documents are the result of generating and executing a modified query wherein the modified query is based upon an analysis of a random subset of the set of documents which are directly responsive to the user query. At step (a), the system processes the user entered query against a database and returns an initial set of documents responsive to the query. The system randomly culls a subset of responsive documents for further processing for the purpose of generating a modified query based on the content or nature of the randomly selected subset of responsive documents.

At step (b), after culling the random subset of documents, the system analyzes the subset of step (a) with respect to their language-invariant, content-correlated fields, producing tallies of the occurrences of different values in those fields. The value tallies for those fields contribute to a "signature" of the content of interest to the user based on the sample obtained in step (a). At step (c), the tallies and "signature" obtained in step (b) are used to inform weighting of additional search criteria. For each of the most prevalent values (configurably defined) of the language-invariant fields, a search criterion is formulated to stipulate that the value be found in that field. The new criteria are appended to the original text-term search criteria with a "WOR", a weighted fuzzy OR, as the connective and with weights determined by the tallies obtained from the sample in step (b). Amplification of the original query expresses to the search system the signature being sought, which signature may be identified in the corpus even in documents that do not satisfy the original text-term search criteria. The differential weights provided induce the search system to return results that are scored in good correlation with the user's interest. At step (d), the results of the large WOR of disparate criteria are generally very numerous, trailing off in relevance to the user as they are brought in by only very few of the search criteria, with ever fewer match occurrences. The method cuts off the result by a combination of threshold considerations involving number of results and scores.

The third invention provides a method of search expansion and query modification to overcome typical narrowing, with respect to intention, of search results from text-term search queries in searching multi-fielded data, provided the data include fields that are content-correlated but language invariant. Undesired narrowing is often due to particular choice of language, particular variant of terminology within the language, and particular grammatical form and spelling of terms from the terminology. The method utilizes the language-invariant fields to amplify the original text-term search query. The text-term search query is submitted with a configurable low cap on the number of results to be fetched. In one manner the invention culls at random an initial subset of 100 responsive documents from the initial results for analysis. The fetched results are analyzed in respect of their language-invariant, content-correlated fields, producing tallies of the occurrences of different values in those fields. The value tallies for those fields contribute to a "signature" of the content of interest to the user, as based on the sample obtained. Based on the signature the query is amplified. The tallies obtained are used to inform weighting of additional search criteria. For each of the most prevalent values—configurably defined—of the language-invariant fields, a search criterion is formulated to stipulate that the value be found in that field. The new criteria are appended to the original text-term search criteria with WOR as the connective and with weights determined by the tallies obtained from the sample in step (b). For example, values occurring more frequently in the sample results of step (a) may be assigned more weight in the criteria for the signature search than less frequently occurring values. This amplification of the original query expresses to the search system the signature being sought, which signature may be identified in the corpus even in documents that do not satisfy the original text-term search criteria. The differential weights provided induce the search system to return results that are scored in good correlation with the user's interest. The results of the large WOR of disparate criteria are generally very numerous, trailing off in relevance to the user as they are brought in by only very few of the search criteria, with ever fewer match occurrences. The method cuts off the result by a combination of threshold considerations involving number of results and scores.

In operation, the above described methods may be combined as search criteria against a pseudo-field, which may be labeled "About these" or "Signature search" or "Signature Similar" or the like, in arbitrary Boolean combination with traditional search criteria against real fields. This affords the user free mixing of approaches within a single user interface. The user interacts with a GUI search form with screen fields associated with ordinary data fields, but also with an "About these" screen field not associated precisely with actual data fields. The user may enter terms characteristic of the area of interest in the "About these" screen field. The terms may be in any language with representation in the corpus data. The terms entered in the "About these" field are individually treated. The strongest suggestions are used in OR-combination with the respective entered terms, each amplified term set to be used in separate criteria against the different strata of text fields in the subsequent signature-deriving (below) and signature-using (below) searches. "Strongest", in cutoff for the series of suggested terms, is interpreted more strictly against the broader-field strata, more loosely against the narrower-field strata. The suggested-term-amplified text search criteria are used to obtain a sample result set. The results are analyzed for value frequencies in the chosen language-independent, content-correlated fields. Signature-search criteria are crafted and the signature search is run. The results of step (e) are then used in whatever Boolean combination the user has specified with results of other criteria collected in the search form.

In a first embodiment of the third invention, the invention provides a computer implemented automated method comprising: receiving a user query; searching a set of documents contained in a database to identify a first subset of documents responsive to the user query, the first subset of documents being a subset of the set of documents; analyzing a second subset of documents, the second subset of documents being randomly selected from the first subset of documents; based upon the step of analyzing, generating a modified query; executing the modified query against the database to generate a set of final documents, the executing comprising: searching the set of documents using a first portion of the modified query corresponding to the user query; and searching, using a second portion of the modified query, a set of fields corresponding to a set of records in the database to obtain a set of extra documents, the set of records in the database having a one-to-one relationship with the set of documents, the intersection between the first subset of documents and the set of extra documents being the null set; storing a signal associated with the set of final documents; and transmitting the signal. The first embodiment of the third invention may further comprise wherein the set of final documents is ranked according to a set of statistics associated with the step of analyzing.

A second embodiment of the present invention provides a computer-implemented method of improving performance of a computer to provide expanded semantic searching of results in a computer-implemented search of a corpus of documents, the method comprising: a. operating at the search-controller level to mediate between a request function and an underlying generic text-search system and electronically receiving a query containing a set of search terms from the request function; b. by a processor, determining a topic based on the set of search terms and identifying documents related to the topic irrespective of whether the identified documents contain any of the set of search terms, the step of identifying documents comprising: c. performing a narrow search-term expansion by determining alternative terms to be combined with the submitted set of search terms to create a narrowly expanded search term set for use by the search engine, narrow search-term expansion adapted to result in an initial broadening of the sampling-search step (d); d. performing a sampling-search using the narrowly expanded search term set determined in step (c); and e. retrieving data from a set of sample fields as a sample set of the identified complete set of responsive documents, the set of sample fields being preselected to be language independent but strongly topic correlated.

The second embodiment may be further characterized as follows: further comprising: f. performing statistical analysis of the distribution of values in the retrieved content-correlated, language-independent fields; g. generating a "signature" of the responsive documents in terms of values of the respective fields per the analysis in step (f), the signature incorporating quantifiers monotonically related to the observed prevalence of the values in their respective fields as revealed in that analysis; h. submitting by the search-controller to the generic text-search engine a query that is a weighted-OR of criteria stipulating occurrence of the top values observed in the analysis in step (f), the weights on the values being the computed quantifiers of the signature from step (g), together with criteria stipulating occurrence of the terms from the narrowly expanded arrays of search terms determined in step (d); and i. collecting identifiers of the responsive documents from step (h), each with its relevance score as computed by the generic text-search engine, in order of decreasing relevance score, cutting off at a point determined by configuration parameters; wherein the set of sample fields including one or more from the set consisting of classification-code fields, cited-document fields wherein the document identifiers are standardized, and standardized keyword fields; further comprising relevance ranking results returned by the generic text-search engine is induced to accord better with the focus of the returned documents on the subject of interest to the requestor through use of an automatically generated, intentionally redundant sequence of search clauses for each of the narrowly expanded arrays of search terms determined in step (c), the clauses being in the form of: <OR of expanded terms> in <fields_1>, <OR of expanded terms> in <fields_2> thereby addressing a nesting of scopes of focus by target fields; further comprising relevance ranking results returned by the generic text-search engine induced to accord better with the focus of the returned documents on the subject of interest to the requestor through use of an automatically generated, intentionally redundant sequence of search clauses for values of certain of the content-correlated, language-independent fields drawn on in step (f), analyzed in step (g), and incorporated in the signature computed in step (h), the search clauses being in the form of: <scope_variant_value_1> in <field>, <scope_variant_value_2> in <field> thereby addressing a nesting of scopes of focus by sought values; wherein the narrow expansion of each submitted term further comprises: operating at the search-controller level to mediate between a request function and an underlying generic text-search system and electronically receiving a query containing a set of user-supplied search terms in a source language from the request function; submitting the set of user-supplied search terms in the source language to the underlying search engine and returning a set of responsive documents by matching the set of user-supplied search terms with terms in a set of source language fields associated with the set of responsive documents and having a set of values that are relatively short and keyword dense in comparison to the associated document; statistically analyzing the set of values in a set of target language fields associated with the set of responsive documents, the target language fields being relatively short and keyword dense in comparison to the associated document; and generating a set of suggested search terms in a target language other than the source language; further comprising: automatically choosing by the search controller the set of source-language fields having values that are relatively short and keyword dense in comparison to the associated document; and automatically choosing by the search controller the set of target-language fields having values that are relatively short and keyword dense in comparison to the associated document; further comprising scoring the set of suggested search terms based at least in part on a set of usability criteria, with each suggested search term scored for its usability as a search term against one of the set of target language fields; further comprising selecting a set of suggested terms based on a set of threshold criteria for use in a search against one or more of the set of target-language fields; wherein the selected set of suggested terms is used in searching the target language fields in addition to or instead of using the set of user-supplied search terms to search the set of source language fields to find documents of interest; wherein the narrow expansion of each submitted term as prescribed in step (a) is enhanced by specific facilities providing only very tight synonyms to improve document coverage without the risks of broadening, in terms of meaning, too early, or inadvertently digressing to alternate meanings at a stage where later stages will magnify any error; wherein freer broadening is done on the search terms as incorporated into the search request submitted in step (f), as by rules for alternate spellings, to improve parity of relevance scoring for documents showing different spelling alternates with minimal danger of contamination of the results with false hits, at least among higher-scored results, thanks to the protection afforded by all the additional search clauses involved in the complex request submitted in step (f); wherein with single-word and multiword search terms submitted as described, fragments of ordinary search syntax may be submitted, internally utilizing operators such as Boolean connectives (AND, OR) or proximity operators (ADJ, NEAR), these fragments bypassing step (a) and being incorporated in the search requests of steps (b) and (f), thereby ceding a portion of the expansion responsibility to the reqeustor, per the requestor's effective request, while still providing the remainder of the expansion service, executing step (a) for any simple single-word or multiword terms submitted along with such fragments of search syntax, and executing steps (b) through (g) for the entire submission; wherein the given series of single-word or multiword search terms and/or fragments of ordinary search syntax are submitted as a portion of a larger search request, wherein this portion, treated as a pseudo-field constraint, interacts with other portions of the request by customary search operators, such as AND, OR, and NOT.

A third embodiment of the present invention provides: a facility including a computer-based search system configured to improve operational search performance of the search system to provide expanded semantic searching of results in a computer-implemented search of a corpus of documents, the facility comprising: a generic text-search engine; a search-controller in communication with the generic text-search engine and an applications services layer connected to a communications network for receiving a search query, the search-controller configured to mediate between a request function and the generic text-search engine and to electronically receive a query containing a set of search terms from the request function; a multi-phase semantic expander adapted to determine a topic based on the set of search terms and identifying documents related to the topic irrespective of whether the identified documents contain any of the set of search terms; whereby the search controller is further adapted to: a. perform a narrow search-term expansion by determining alternative terms to be combined with the submitted set of search terms to create a narrowly expanded search term set for use by the search engine, narrow search-term expansion adapted to result in an initial broadening of the sampling-search (b); b. perform a sampling-search using the narrowly expanded search term set determined in (a); and c. retrieve data from a set of sample fields as a sample set of the identified complete set of responsive documents, the set of sample fields being preselected to be language independent but strongly topic correlated.

Compared to existing methods, the three inventions disclosed herein offer, among other advantages, the following advantages: 1) enhanced searching; 2) semantic query expansion; 3) improved relevancy ranking; 4) cross-lingual searching; and 5) query modification to enhance search results. The present inventions provide algorithms that improve the baseline search significantly at speeds on the millisecond level and allow for expanded sets of responsive documents for consideration by the user. Enhanced searching may be provided by implementing one or more of the inventive techniques described herein separately or in combination. Improved relevance rankings may also be based upon search term query expansion and/or a combination of other relationships.

BRIEF DESCRIPTION OF THE DRAWINGS

In order to facilitate a full understanding of the present invention, reference is now made to the accompanying drawings, in which like elements are referenced with like numerals. These drawings should not be construed as limiting the present invention, but are intended to be exemplary and for reference.

FIG. 2A is a diagram illustrating a cascade of term-suggestion panels arising from the cross-lingual search-term suggester presented here as invention (II);

DETAILED DESCRIPTION OF THE INVENTION

Figure 1A:
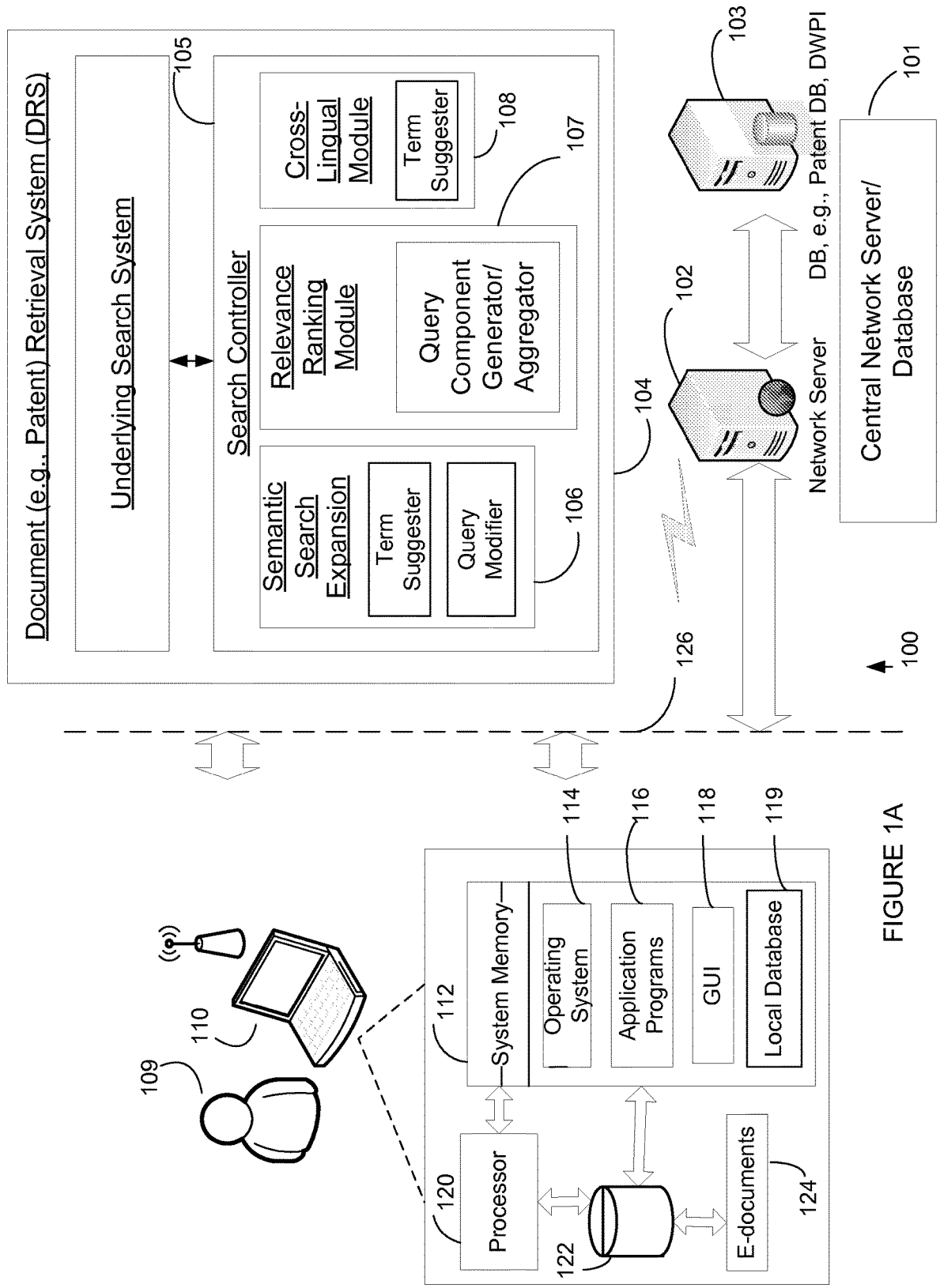
FIG. 1A is a schematic diagram illustrating an exemplary computer-based system for implementing the various inventive aspects.

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

We describe the present inventions in terms of specific embodiments in a system for searching patent data. It will be understood by those skilled in the art that the applicability of these inventions is in no way limited to the domain of patent information. The mechanisms suggested here carry over with no essential change to the domain of research literature, for instance, and other fields of endeavor, particularly those involving documents having associated searchable keyword-dense fields. It will also be appreciated by those skilled in the art that different search systems may be modularized differently, so that what is here described as happening in the "search controller" may in some embodiments be integrated into what we here refer to as the "underlying search system," the provider of basic search-index access, with pattern and proximity matching and Boolean-operation functionality.

We use the term "ranking" to refer to assignment of ordinal positions among the individual results of a search, first, second, third, etc. We use the term "scoring" to refer to the assignment of numerical values as grades or scores. Generally, a scoring carries finer-grained information than a ranking Any ranking trivially yields a scoring by monotonic transformation of its assigned ordinals. More usefully, a scoring can determine a ranking, at least up to discrimination among like-scored results. The scoring, however, carrying more information, can also inform subsequent composite scorings taking into account other query components, with only the ultimate composite scoring determining the ranking of results to be returned, perhaps to an end user, in response to a complex query. So, while the ultimate goal is to present an end user with well-ranked (and comprehensive) results, its achievement entails not only good ranking of intermediate results but good scoring.

Invention (I): Focus-Spectrum Expansion for Focus-Sensitive Relevance Scoring

In traditional professional searching against patent data, which are highly structured, a searcher submits basic queries of the form <single-word or multiword term> in <field>—meaning, find documents that have the specified term in the specified field—and may combine such basic queries, using the available operators. Syntactic shortcuts typically allow constructs such as (some stylistic variant of):

$$OR(t1, t2, \ldots) \text{ in } f1, f2, \ldots$$

to mean, find documents that have at least one occurrence of at least one of the specified terms ti in at least one of the specified fields fj. Complex queries may be tens of thousands of characters long. This standard style of professional searching affords the searcher much fine control over the search, but this degree of control comes with fundamental dilemmas. The best-known one concerns the choice of natural-language terms to fetch the records of interest. Terms may, via extraneous senses, pull in undesired results at the same time as they fail to retrieve documents of interest that happen to use different spellings, grammatical forms, or terminological preferences within the same language, or are in an entirely different language. The present inventions (II) and (III) are aimed, in part, at addressing these difficulties. But there is a more general problem when specifying search criteria. How restrictive or permissive should the query be, in the face of the obvious precision/recall trade-off? Common practice in professional searching is to do rounds of experimentation. But it would save much time and effort if results could be returned right at the outset with documents responsive to a restrictive version of the query at the top and documents responsive only to a more permissive version of the query farther down in the ranking We clarify this problem and show how, particularly in the case of structured data, the search controller can alleviate it in automated fashion by pre-identifying certain "focus spectra" and instituting corresponding strategic query expansions to get the underlying search system to deliver the broad but well-ranked results the searcher would like.

For any interest a searcher may have, there are different dimensions of focus which could characterize potential responsive documents. The most obvious dimension is the scope of the domain of interest itself as addressed in the document, i.e., how specifically the domain of interest is addressed in the document. Less obvious, but of particular interest to patent prior-art search and to historiography of ideas in academic research, is the degree to which discourse about the domain of interest to the searcher is central, topical, the subject of the document being considered. This is because a document that discusses the domain in an ancillary manner is not likely to be one that itself is pushing the frontier in that domain. A patent document presenting an invention in one area of technology may mention many other areas of technology that the patent is not remotely "about," whether in describing the background of the invention or in enumerating components incorporated as pre-existing "black boxes" in the new invention. For instance, the many patents that introduce technologies involving computerized control modules, as in automobiles, irrigation systems, medical devices, etc., are hardly "about" computers, although they may contain many occurrences of an assortment of computer-related terms. These are not the documents a searcher would want to find near the top of a ranking of results in response to a query for inventions in computer technology. But how would a search service discriminate among term-match occurrences in a document with respect to their indicativeness that the document is actually about the concept being searched for?

Invention (I) exploits available fields in structured data to automate a substantial advance in returning ranking sensitive to the "about"-ness dimension of focus. We explain this first, and then show how a corresponding approach can address the domain-scope dimension of focus as well for content in sufficiently formalized metadata fields, particularly, hierarchical-classification codes. The further problem of finding and ranking documents by specificity to the do-main of interest, as distinct from the topicality of discussion of that domain in the document, when the searcher's interest is expressed via natural-language terms—as opposed to classification codes in a known hierarchy—is, of course, just the familiar general problem of semantic search as usually framed. It is addressed by the here-disclosed trio of inventions when acting in concert, rather than by invention (I) in itself, as will be seen.

Considering the topicality in the candidate documents of the domain suggested by the searcher's natural-language query terms, how do we assess it? Clearly, quantity of occurrences of the query terms in the document is not an adequate indicator of topicality. In unstructured—or not uniformly structured—data, we could only try unreliable heuristics guessing at the map of the discursive regions of the document and attempting to characterize the functions of those regions in the discourse, i.e., guessing at structure not given explicitly. But with structured data such as patent data, we can do very much better. The field structure of patent data provides abundant cues to topicality. For instance, while mention in the abstract (in one linguistic guise or another) is not a sufficient condition for topicality, it is clearly a necessary condition. So a user wanting documents in which the concept is truly central might confine the search to documents that allude to it in the abstract. (On the other hand, and quite pertinently, the abstract is a small target, so it is easy to fail to query for just the vocabulary that happens to be used in that short segment of text, causing search misses with respect to the searcher's intention; hence, actually restricting attention to the abstract would not be wise if recall must not be compromised, even if the searcher does only want documents addressing the concept at the topicality level of the abstract. This difficulty is addressed by the present inventions (II) and (III).) To make these observation relating particular fields in structured data to the focus dimension of topicality more concrete, we roughly enumerate the fields of natural-language text in a patent document that are intended, at least in part, to describe at some level of detail the entirety of the invention that is the subject of the document, or portions or aspects thereof. Analogues of the assortment of patent-data descriptive-text fields, one immediately realizes, may be found in other corpora of structured text.

In discursive and content-bearing natural-language text data—as opposed to specifications of authors, inventors, institutional affiliations, assignee companies, copyright notices, classification codes, processing dates, . . . —we can generally partition the fields of structured data into four strata by relative topicality, thus:

titles, keyword fields;
abstracts;
claims (in patent documents);
bodies of articles, patent backgrounds and detailed descriptions, drawing descriptions, and all the rest.

Consider a searcher specifying a concept of interest via a natural-language term in a query against a corpus of structured data with such fields. Suppose the search system was designed to relieve the searcher of the trouble of choosing the specific content-bearing natural-language text fields in which to search. What fields should the search system choose? The problem is that we cannot generalize regarding the degree of focus appropriate for the particular searcher. One searcher may want only documents most unequivocally "about" the concept, while another may be anxious not to miss any allusion to the concept, however tangential. In the spirit of the new approach to professional search that the present inventions are intended to advance, the resolution of this problem is to be quite liberal in inclusion in the returned results, but to present the broad set of results in a ranking by focus with respect to the specified concept. To accomplish this, a query OR(t in titles,abstracts,claims,description, . . . )

would miss nothing, but would have no chance of achieving ranking by topicality. But even if we decompose this into a sequence of four queries, $q_1$: t in titles
$q_2$: t in abstracts
$q_3$: t in claims
$q_4$: t in description, . . .

it remains to combine these in a manner that does get us the desired topicality-sensitive ranking.

A similar problem obtains of specificity-sensitive ranking given a patent-classification code of interest to the searcher. The International Patent Classification (IPC) is a hierarchical scheme of classification by areas of technology that has been broadly used by patent authorities around the world for decades, and hence is heavily relied upon by patent searchers. In this scheme, the code B25J is the "subclass"—level classification code for robotic manipulators, and the code B25J 13 is the "group"—level refinement of the B25J code to specify control technologies for these manipulators. A user may express a specific interest in classification B25J 13/02, described as addressing "hand grip control means." But in semantic expansion we would want to include other closely related control technologies classified under B25J 13, such as "foot-operated control means," which are more specifically classified as B25J 13/04. So we are simultaneously interested in the more specific B25J 13/02 classification and in the less specific B25J 13 classification. We can formulate two queries, one for each degree of specificity, $q_1$: "B25J 13/02" in IPC $q_2$: "B25J 13" in IPC and again the question remains as to how to combine these to get the desired, in this case specificity-sensitive, ranking.

More generally, suppose we have a sequence of queries $q_1, q_2, \ldots, q_n$ with the property that the results of query $q_i$ if submitted on its own are expected, absolutely or with high likelihood, to be a subset of the results of query $q_j$ whenever $i<j$. Earlier queries in the sequence may be regarded as being more focused than later queries, so that the sequence as a whole represents a spectrum of focus along some dimension. The two query sequences we have shown, the four-query sequence for term-of-technology topicality and the two-query sequence for IPC-code specificity, have this property. Note that if we are concerned that the nesting may not be strict enough in the topicality example, because the particular linguistic choices could be slightly different in the different strata, we could easily get absolutely strict nesting by using $q_1$: t in titles
$q_2$: t in titles,abstracts
$q_3$: t in titles,abstracts,claims
$q_4$: t in titles,abstracts,claims,description, . . .

instead. In practice, the difference in behavior when this is part of a larger approach, as in use of this invention (I) within invention (III), should be minimal.

How do we utilize such a focus sequence of queries to obtain results from the underlying search system scored in a manner reflecting that dimension of focus? An AND operation over the entire query spectrum would deliver only the results of $q_1$, the most restrictive of the queries. An OR operation would deliver the results of all the queries $q_i$, but this totality would just coincide with the results of $q_n$, the most permissive of the queries. To the extent that scoring of search results is based on subquery term-occurrence counts, even the ranking, not just the inclusiveness, of results re-turned by composite query $OR(q_1, q_2, \ldots, q_n)$ may not be much different from that returned by query $q_n$ alone if, as may well be, the occurrence counts for query $q_n$ tend to be large enough to dominate the inter-result score comparisons. Hence, there remains a gap between expressing the relevant focus spectrum as a sequence of distinct queries—a valuable step—and getting the underlying search system to return a result set reflecting that expressed spectrum in its ranking of the results. For these reasons, a competent searcher with the usual operators at her disposal would not be apt to invoke multiple queries from a single focus spectrum interoperating directly; there would be no point. She would just make her best choice of point along the focus spectrum to settle for with respect to her immediate search task. New possibilities emerge, however, when either of two evolved versions of the usual search-system OR operator are available. These turn out to be particularly useful if the search controller can compute a good focus spectrum of queries on its own, and then make use of these operators over the computed spectrum without troubling the searcher. We examine these operators and demonstrate their use for the purpose of focus sensitivity in the returned ranking.

The Boolean OR operator, in logic, takes operands with binary truth values TRUE or FALSE and computes a resultant truth value TRUE or FALSE accordingly as there is or is not at least one operand with value TRUE. Importantly, there is no difference in the resultant value—simply TRUE, with no gradations—whether one operand, or multiple operands, or all operands have value TRUE.

Text-search systems generally offer an OR operator—still referred to as "Boolean"—which behaves similarly in its effect on inclusion of documents in search results, but provides additional functionality, propagating occurrence information affecting ranking of results by relevance. The TRUE value for the alternates under the OR, as for the OR compound as a whole, is replaced by a non-negative number expressing not only satisfaction (or not, if the number is 0) but the multiplicity of the satisfaction. This effective elaboration of the regime of binary truth value serves as a local scoring of each subquery, each local score to be propagated to enclosing subqueries, where it may be processed further, thus informing the ultimate score of the document with respect to the entire query, and hence the ultimate relevance ranking of the returned results. For an atomic in clause specifying that a term be found in some field, the value of the clause as computed for a particular document could be the count of occurrences of the specified term in the specified field of that document. For an OR of several atomic (or composite) clauses, in the latter scheme, the local value for the OR clause, for a given document, could be the simple sum of the values computed for that document for the alternates under the OR. This is the familiar version of OR which, as said, if applied to an entire focus spectrum of queries, could be dominated by the occurrence counts of documents with respect to the least focused query in the spectrum, and so is inadequate for focus-sensitive relevance ranking.

The first evolved version of this OR operator that we consider is the "weighted OR," which we abbreviate here as WOR. (A. Z. Broder, D. Carmel, M. Herscovici, A. Soffer, and J. Zien—in Efficient query evaluation using a two-level retrieval process, in *Proc. of the* 12*th Conference on Information and Knowledge Management* (*CIKM*), pages 426-434. ACM, 2003—define a closely related "WAND" operator, which they describe as a "weighted AND" or a "weak AND," taking a threshold as an additional parameter so as ultimately to yield a binary value. All these operators, including the usual search-system OR, in being modulated by the values of all their operands, demonstrably lie in between the OR and AND of multi-valued logic, which are essentially max and min operators, attentive only to the respective extrema.) The WOR accepts numerical weights which the searcher associates with the alternates under the WOR operator in the query. In typical use, the searcher has a set of terms (typically not of nesting focus) any of which, if contained in the specified field, renders the document as potentially of interest. The searcher could submit an OR composite of in clauses for all those search terms. But suppose he considers certain of those terms to be much more indicative of interest than the others. The usual search-system OR would consider all the alternates under the OR as equally important, so that a document that, in its instance(s) of the specified field, strongly matched the least significant alternate term could be ranked above a document showing a slightly weaker match against, i.e., slightly fewer occurrences of, the most significant alternate term. Using WOR instead of the usual OR and marking the alternate terms differentially with weights reflecting their importance to the searcher can bring the search system's ranking in line with the searcher's interest. Where $w_1$, $w_2$, . . . are numerical weights, the usual:

$$OR(t_1, t_2, \ldots) \text{ in } f$$

is refined to:

$$WOR([w_1]t_1, [w_2]t_2, \ldots) \text{ in } f.$$

This is the most studied use of weighting. (See, for instance, H.-P. Frei and Y. Qiu. Effectiveness of weighted searching in an operational IR environment. *Information Retrieval*, 93:41-54, 1993.) More generally, weights may be attached not only at the level of the individual search term but at any level in the parse tree of a query, i.e., attaching to any subquery to calibrate its relative importance toward the ultimate ranking Implementation-specific details apply.

With WOR available, we have a general solution, implementable in the search controller, for achieving topicality-sensitive ranking for results responsive to a submitted term of technology t. Before deployment of the system, we stratify the available descriptive-text fields as shown for the case of patent data, and assign descending numerical weights $w_1$, $w_2$, . . . to the strata, from most topical to least topical. (The assigned weights would undergo a phase of tuning based on experimentation.) At search-request time, we refer to that stratification of fields in formulating a focus spectrum of queries, $q_1$, $q_2$, . . . , also as shown, but we go further and combine them using WOR and the predetermined weights, yielding, in the case of the patents example,

```
WOR(
    [w₁ ](t in titles),
    [w₂ ](t in abstracts),
    [w₃ ](t in claims),
    [w₄ ](t in description,...)
).
```

In much the same fashion, weights could be predetermined for full IPC codes relative to their coarsenings to group-level codes. At time of user-requested search for code B25J 13/02, the search controller would actually submit the more elaborate query to the underlying search system,

```
WOR(
    [w₁ ] ("B25J 13/02"    in    IPC),
    [w₂ ] ("B25J 13"       in    IPC)
).
```

Similar advantage can be gained from quite a different evolution of the OR operator that may be offered by the underlying search system, a version of the operator which we will refer to as a distribution-biased OR, or DOR. Under DOR, scoring advantage is given to broad distribution, across the alternate clauses under the DOR, of their cumulative search-term occurrences. For example, ten search-term occurrences spread across three of the alternates under the DOR operator would give the DOR composite as a whole a higher score than ten occurrences all clustered in a single one of those alternates. (A numerical example of such sorting has been described above with regard to relevance ranking using focus-spectrum expansion component queries.) The distribution bias confers a measure of AND-like behavior to this OR-family operator, very appropriate to typical intentions of searchers, who will specify OR for safety—as AND would lose documents that fail to match some of the specified alternates perhaps due to quirks of linguistic choice—but who really are interested in the documents that do combine the specified concepts. A DOR capability may admit considerable configurability as to just how it will behave. For the present purpose, fine tuning aside, what matters is that we see how it contributes to focus-sensitive ranking if applied to a focus spectrum of queries.

By design, a focus spectrum of queries has the property that a document that is a match for the first, most focused of the queries in the sequence will also be a match for all the remaining queries in the sequence, achieving the broadest possible distribution across the sequence of queries; a document that is not a match for the first, but is nevertheless a match for the second of the queries, still is expected to be a match for all the succeeding queries in the sequence as well, achieving the next broadest possible distribution; and so on down to the least focused end of the spectrum. That is, the breadth of distribution of query matches across the spectrum of queries for a candidate document correlates with its degree of focus along whatever dimension of focus—such as topicality or domain specificity—is captured by that focus spectrum of queries. As a result, a DOR operator applied to the entire query spectrum will give scoring boosts to responsive documents in accordance with their degree of focus along that dimension, thus introducing focus sensitivity to the resulting ranking.

Accordingly, the use of DOR within this invention (I) is much the same as the use of WOR, as explained. Focus spectra are predetermined before system deployment based on an understanding of the content domain. Weights would not be assigned, but the DOR capability may be tuned. At search-request time, DOR would be used just as we showed WOR being used, but without the weights.

The underlying search system may provide an enhanced OR capability that combines distribution bias with support for weights on subqueries, combining the properties of DOR and WOR. Those skilled in the art will know how to apply the directions given here to exploit this combined capability for improved focus-sensitive ranking, via search-controller intervention, as another manifestation of this invention (I).

The relevance ranking invention may be thought of in terms of a focus-spectrum expansion for focus-sensitive relevance scoring and is executed by a search controller, e.g., 105, operating in connection with a document retrieval system DRS, e.g., 104, for querying a collection of documents or records based on a user input and provides enhanced searching capabilities compared to prior efforts to search and retrieve matching documents based on a user query. For example, using a traditional Boolean search will typically only generate a set of responsive documents that have an exact match between query and content within the document, e.g., a patent having the exact string "dynamic random access memory." Even where the result set is ranked the results are often simply ranked based on indiscriminant number of term occurrences within a document. Such a process then requires expertise and further manual effort on the part of the user to yield good results, i.e., additional vocabulary, synonyms, stemming; wild card operators; term translations; complex strategies using Boolean and Proximity operators; iterative development of a search; and manual multi step search approach.

The relevance ranking invention, in the context of a document retrieval system, ranks documents or records based not strictly upon the number of occurrences of a search term but also on the number of fields and/or type of field(s) in which a search term appears. Other aspects of the invention may be used such that the search terms may be supplemented or augmented using cross-lingual and query expansion features, and/or a combination of other relationships, in conjunction with the relevance ranking feature. One problem associated with prior art attempts at ranking documents is that such approaches simply rank search results based upon the number of times a search term appears in documents regardless of field type, locations, etc. The present invention applies algorithmic functions that account for the fields in which search terms appear in a document and may weight or score the occurrence of the search term in a field based upon a predetermined level of importance of that field vis-à-vis other fields.

Figure 1B:
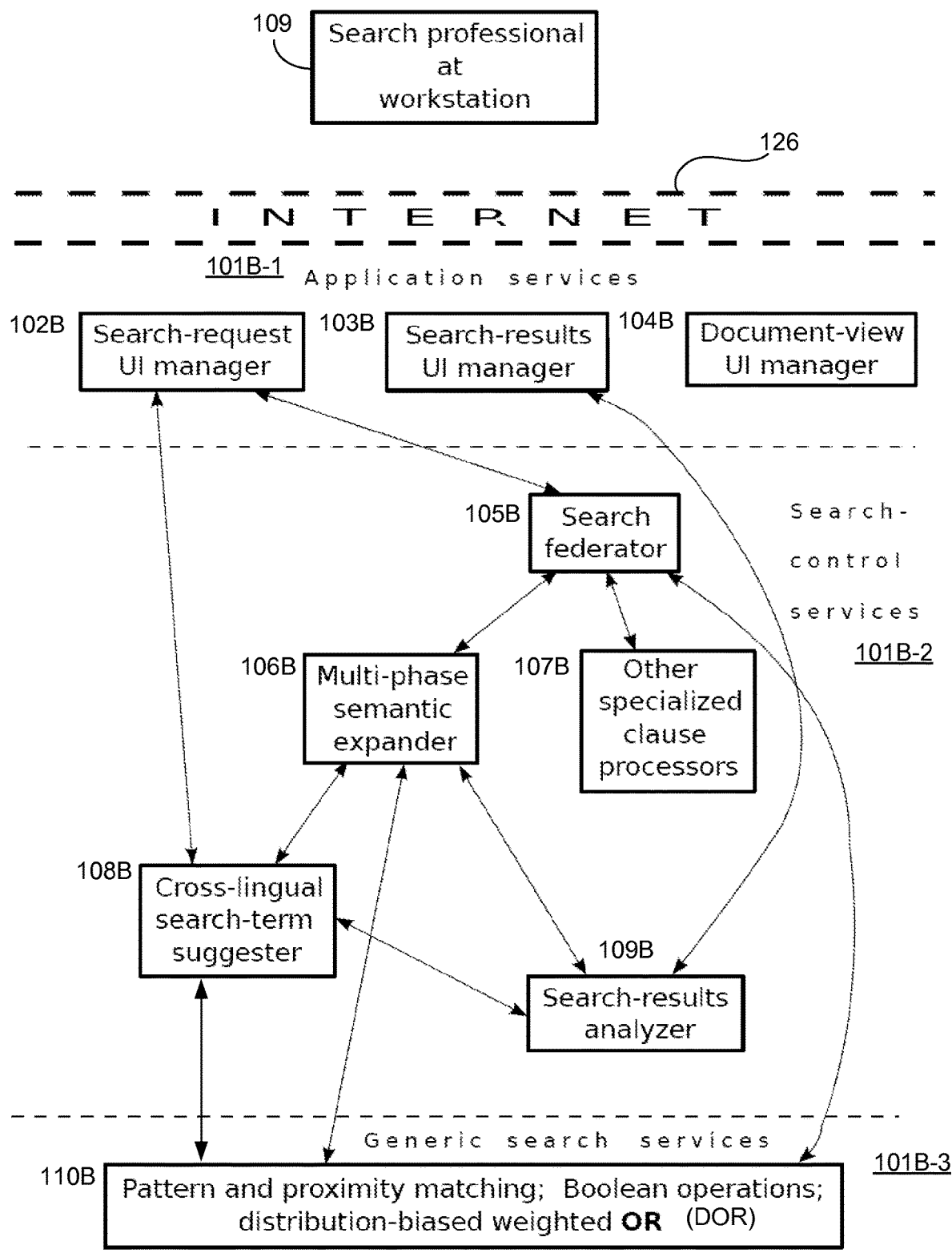
FIG. 1B is a schematic diagram of functional interrelatedness of executable code modules executed by a processor-based system for implementing the various inventive aspects.

In the context of the relevance ranking feature of the present invention, and with exemplary reference to FIG. 1B, a user query entered using the graphical user interface into DRS system 104 is applied as component queries to predefined or definable fields of documents or records being searched in a database. For example, the instructions 154 executed by processor 132 includes code sets adapted to maintain a database comprising a set of data records searchable by the underlying search system. The underlying search system provides a distribution-biased OR operator whereby broader distribution of the relevance-score contributions of the arguments gives advantage in the relevance scoring of the composite. The instructions 154 further include code adapted to define a mapping that assigns to any input query a set of component queries associated with the query, the component queries to be executed against the database using the underlying search system. The set of component queries comprises two or more component queries, e.g., in the context of a patent related search, title, abstract, field of invention, summary of invention, background, claims, detailed description. In one manner of operation, the component queries may be structured as follows: a first component query and a second component query that has broader scope compared to the first query, and possible successive queries progressively broader in scope.

The processor 132 executes code adapted to implement the mapping in software as a generator and receives a user query, generates a set of component queries for the received query using the generator, and submittings the component queries composed with the distribution-biased and/or weighted OR operator to the underlying search system. The underlying search system generates a set of search results responsive to each of the component queries, each set of search results comprising a subset of records from the set of records, each record in the subset of records matching the component query and bearing a relevance score with respect to the component query. The underlying search system generates a combined set of search results having relevance scores, the combined set of search results and their relevance scores produced by the distribution-biased and/or weighted OR operator. System 105 collects the results with their relevance scores from the underlying search system.

The improved Relevancy Ranking of search results invention may use intentional redundancy under Fuzzy OR to accomplish improved results. For example, the processor 132 of the computer-based system 104 executes instructions 154 as a software layer between the collection of a user's expressed search query, on one hand, and an underlying search system supporting Boolean operators as it directly accesses indices of term occurrences, on the other hand. The user communicates a search interest as a query in a query language via the user interface. The system 104 is adapted to respond at two different levels of focus, one yielding fewer, more targeted results, another yielding more, but more loosely related, results. In operation the system 104 may provide many additional gradations of response focus between the two extremes of targeted and loosely related result sets. The user is not required to specify a desired level of response focus. The user tolerates and even appreciates a broad response provided that the ordering of the returned results correlates with diminishing relevance to the user's query, the most relevant returned items dependably appearing first.

The present relevance-ranking invention involves an automated expansion, at search time, of a user's query into multiple component queries under a specialized OR, as accomplished by software prepositioned and resident in the search controller running on its processing hardware. The expansion algorithm implemented by the software must be informed by knowledge of the fields and of the data values in the corpus. As described above, available descriptive-text fields may be partitioned into strata to dictate the generation of focus spectra of nesting topicality; and, similarly, how a hierarchical scheme of classification codes lends itself to generation of focus spetra of nesting specificity. The question arises, how many elements, corresponding to the ultimate component queries to be generated, should there be in a focus spectrum? Part of the value in the present invention lies in the fact that the system will have addressed this question in advance and answered it based on expert familiarity with the content domain, allowing all users, expert and novice, to benefit. In general, the more gradations, the more discriminating the ranking can be; but beyond a certain point it becomes impossible to meaningfully-preserve the nesting condition, as described above with reference to specificity-sensitivity ranking in view of a patent-classification code. Also, the broadest, least-focused end of a spectrum may be too broad to be worthwhile. For instance, the IPC scheme readily admits focus spectra of length 5, with the coarsest granularity being that of IPC "section," identified by the first character of each full IPC code, the finer granularities being those of class, subclass, group, and subgroup. (Further levels exist, capturing hierarchy among subgroups, but these are not as readily discerned looking at the codes.) However, the coarsest "section" granularity is simply too broad to be worth incorporating in generated focus spectra for classification queries. Our earlier discussion used two granularities of IPC codes for specificity focus spectra. It would not be unreasonable to go one coarser and also use the subclass level of the IPC hierarchy.

II—Cross-Lingual Searching and Term Suggestion

Patent data, as accessed through a search service, include separate fields for titles, often with multiple title fields populated for the same document. The applicants may supply titles in multiple languages; and the search service may enhance the original data with additional title fields, whether translations of its own, or recomposed titles intended to be more informative. Titles, by nature, do not stray far afield in their subject matter with respect to the domain and nature of the invention. They may be brief and uninformative; or they may be more expansive, in which case they still remain focused. This provides an opportunity for statistical mining of term-pair co-occurrences among the multiple titles of the same document and even within the single titles of single-titled documents. The result of such mining, as described in this invention (II), is a translation capability; and, much more generally, a search-term suggestion capability which expands to a capability to navigate the space of useful search terms.

The advantage of looking at titles is that they are short, focused, and keyword-dense. Any corpus of structured data that has such fields can benefit from the search-term suggestion methodology taught in the present invention.

Figure 2B:
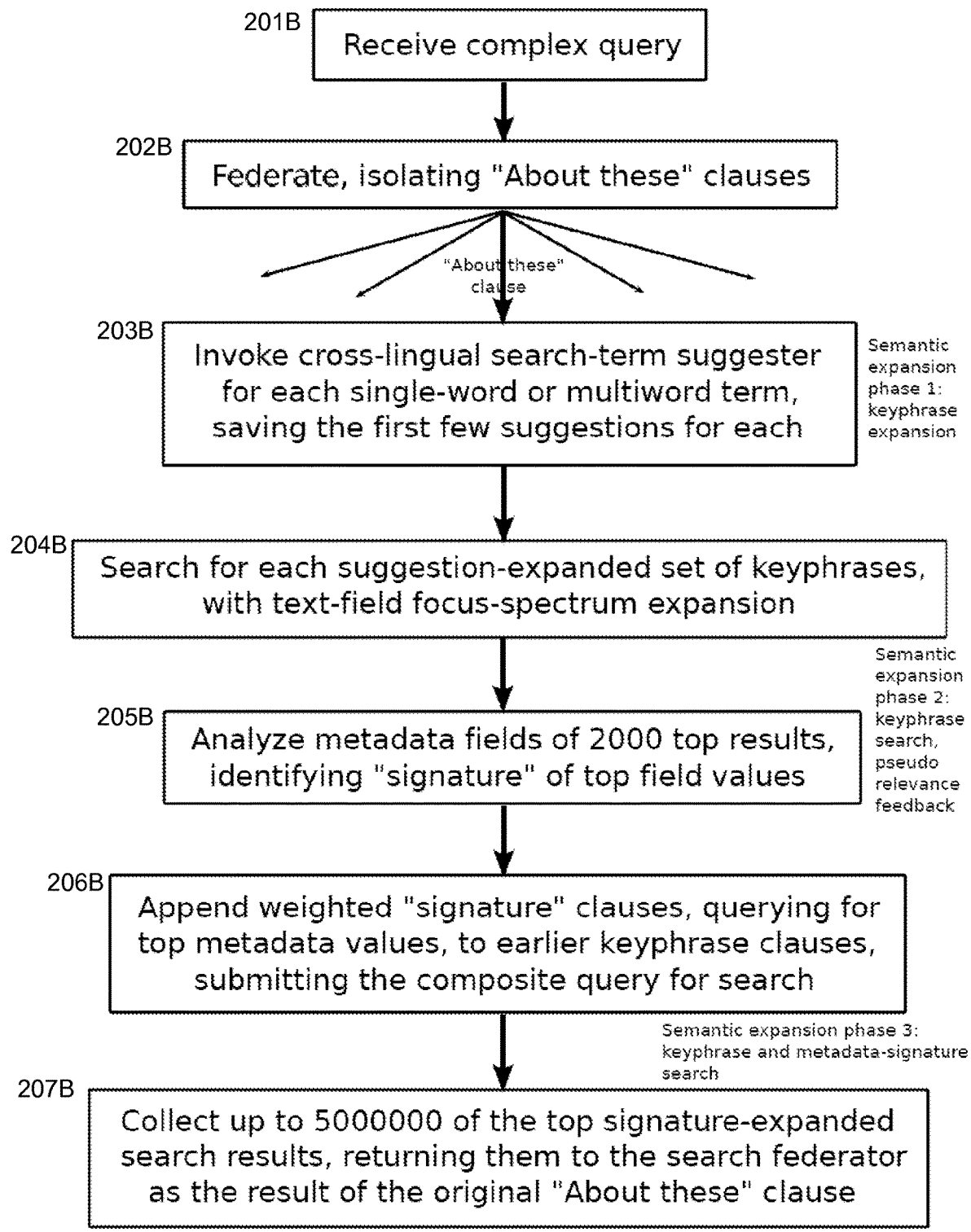
FIG. 2B is a search-term navigation flow diagram illustrating a further exemplary method of implementing a combined semantic search expansion/cross-lingual/relevance ranking system in accordance with the present inventions.

With reference to FIG. 2A, consider a francophone searcher seeking to search English-language documents for references to "athérosclérose," French for atherosclerosis. Searching directly for the French term would yield no English-language results. We need to find a good English search term, and then attempt the search.

Rather than use any dictionary or translation service, we look back into the corpus of patent data itself. We search for documents that have "athérosclérose" in their French titles, but also have English titles. We retrieve 1000 or 2000 such documents, randomly, and study the term frequencies in their English titles. (Because titles are so focused, there is no need to fuss over analyzing only the "best" results, according to some ranking, as by occurrence counts. A random sample is fine.) We do not do any grammatical analysis, but simply look at n-grams, up to 4-grams, of words from those English titles, allowing a few extra intervening words we regard as acceptable "glue," such as "of" in the term "center of gravity." Of course, this simpleminded retrieval returns many common words to be found throughout English text, regardless of subject. Additionally, we find words that are particularly common throughout English-language patent titles, words like "method" and "system." It does not take many rounds of retrieval to learn what those common and uninteresting words are. These can be listed and screened out of the analysis. So what are the n-grams that are left? Once we have removed the common words, those uniformly distributed throughout English title data, the most common of the n-grams that are left must be single-word and multi-word phrases that are particularly associated with the seed we entered—in our example, the French word "athérosclérose."

In ranking the most common extracted English n-grams, we want to take into account their frequencies in the documents returned by the search. But we also want to color those frequencies by the "background" frequencies of the same n-grams in English titles of the patent corpus in general. The degree of "boost" over the background frequency needs to be composed into the scoring. (TF-IDF is a slightly different approach to the same need to "color" the scoring by frequency in the background. The particular formula used for discounting the scores of frequent terms in recognition of their prevalence in the background is immaterial to the present invention (II).) This entails maintenance of a table of background frequencies that may be updated as infrequently as once a year with no adverse effect expected on the quality of the suggested-term rankings.

Term 201 in FIG. 2A shows a searcher's entered term, "athérosclérose," the first generation 202 of suggestions of English search phrases offered when the user invokes the suggester on the entered term, and then the second generation 203 of suggestions offered when the user solicits further suggestions seeded by the suggestion "RESTENOSIS" from the first-generation suggestion panel. This solicitation of suggestions may be iterated further. Accordingly, we have a system of cascading search-term suggestions that effectively affords a navigation capability in the entire space of effective search terms. We know we are justified in speaking to the effectiveness of the search terms; they are drawn from the very corpus being searched, and are scored based on their prevalence statistics in that corpus.

In one manner of integration of this navigation capability into a search interface, the suggestion cascade is launched by the user indicating a term in a search request being crafted as the starting point in the quest for alternative or amplifying terms. The user interface allows marking for use of particular terms throughout the cascade of suggestion panels. At the searcher's behest, the so-marked items from all the suggestion panels are brought together, each chosen multiword term enclosed in double quotes, and the totality of the assembled marked terms put under an OR operator as a replacement for the term that began the cascade. (The originating term is available for marking, and thus retention, as well.) The searcher is then free to edit the result, changing operators and parenthesized grouping at will.

This capability is not restricted to cross-lingual needs. It is possible to go from French to French or from English to English, for instance, the latter in fact anticipated to be the most frequent use of this capability.

As said, ecause the suggestions are driven entirely by the contents of the very corpus to be searched itself, there is greater assurance that the suggested terms will actually serve the user's search purposes than would look-up in external sources.

FIGS. 2A, and 8-16 illustrate exemplary diagrams and user interface screen shots and search functionality by which the system performs cross-lingual capabilities and other useful functions. Essentially, this invention enables cross-lingual searching and term suggesting. This is accomplished by, e.g., providing a searcher entering a non-English search or "source" term with suggested English search-term options selected from a scored table of terms generated on demand by analysis of documents containing both the non-English search term, in one or more content-focused and keyword-dense fields in that language, and one or more English-language fields that are likewise content-focused and keyword-dense selected from a term frequency table generated for documents containing both the non-English search term and English terms or metadata.

Figure 8:
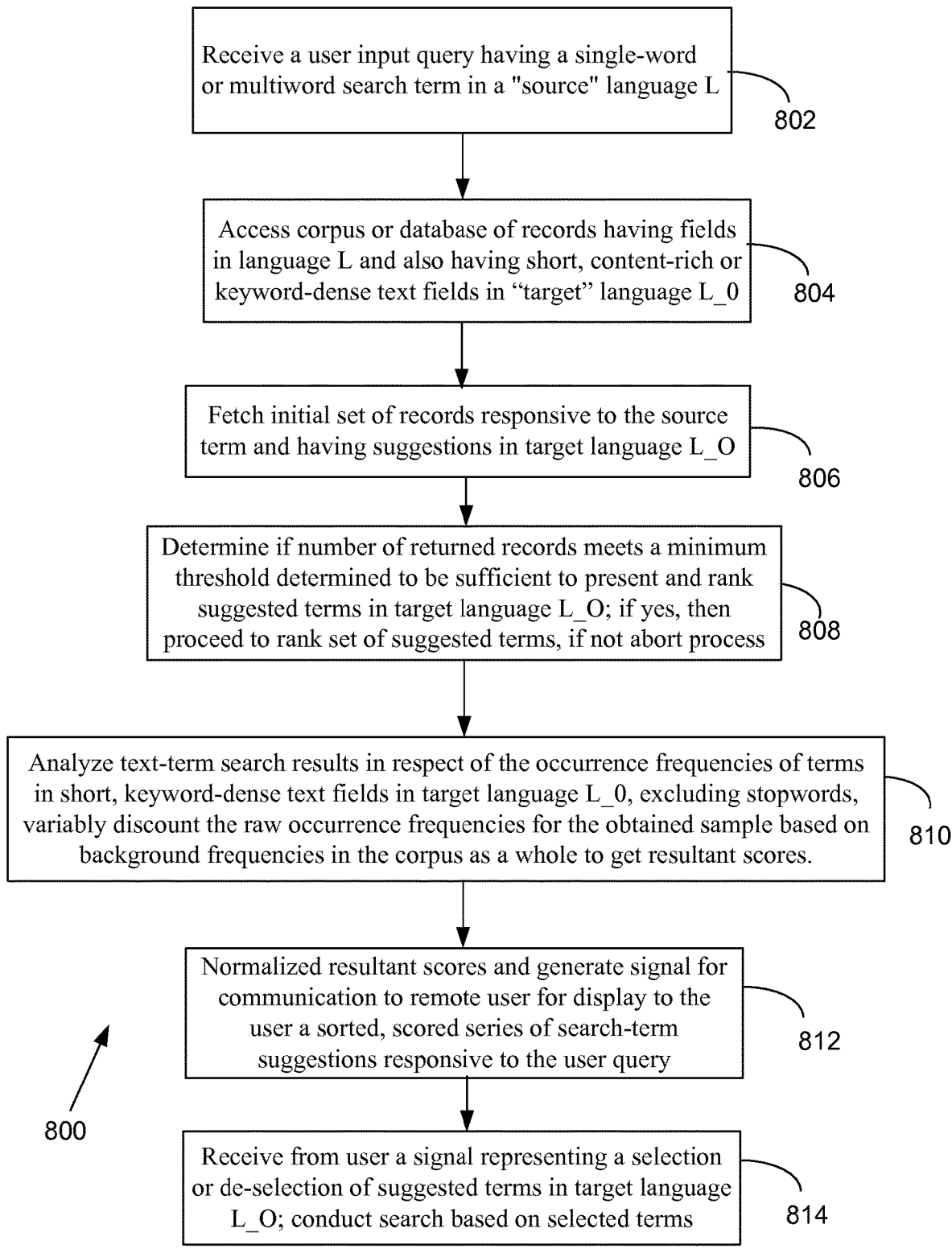
FIG. 8 is a flow diagram representing an exemplary cross-lingual search expansion process in conjunction with the present invention.

With reference to FIG. 8, in one manner, the cross-lingual feature of the invention provides a method of suggesting new search terms in a particular "target" language ("L_0"), ranked in order of likely usefulness, given a single-word or multiword search term in some "source" language L, which may or may not be the same as language L_0. It is assumed that language L is represented across a broad range of subject matter in short, keyword-dense text fields in the corpus being searched; and that a substantial portion of the records with such fields in language L also have short, keyword-dense text fields in language L_0. No local or remote dictionary or translation service is assumed or produced in applying the present method. No grammatical analysis is solicited or done.

In terms of speed, response time, from a user submitting a term in a source language L to the display of ranked suggestions for the user in language L_0, is on the order of a few seconds, appropriate for interactive use. At step 802, a user enters a query comprising a set of query terms in a source language L. The cross-lingual search system receives the user input query and, at step 804, accesses a corpus or database of records and performs a text-term search for the source term in the short, keyword-dense fields of the entire corpus. This step may be performed either irrespective of language, if the source language has not been specified, or only in fields of the specified source language. At step 806 search results are fetched and returned—but with fetching of results preferably capped configurably at a few thousand. At step 808, the system determines if the number of records returned is below a configurable minimum, and if so the suggestion effort is aborted. The minimum may be quite low. 50 records provide a solid basis for suggestions, and even fewer than 10 records can yield useful suggested search terms. If the minimum threshold is satisfied then the process continues at step 810.

At step 810, the results of the first step text-term search are analyzed in respect of the occurrence frequencies of all one- to four-word phrases, allowing but not counting "glue" words and disallowing other "noise" words, in their short, keyword-dense text fields that are specifically in language L_0. The raw phrase-occurrence frequencies from the obtained sample are variably discounted based on background frequencies in the corpus as a whole to get resultant scores. At step 812, the resultant scores are normalized and a signal is generated and communicated to the user at a remote user device for displaying a sorted, scored series of search-term suggestions including terms suggested in target language L_0. At step 814, the system receives from the user remote device a signal representing a selection or de-selection of suggested terms in target language L_0; conduct search based on selected terms.

Figure 9:
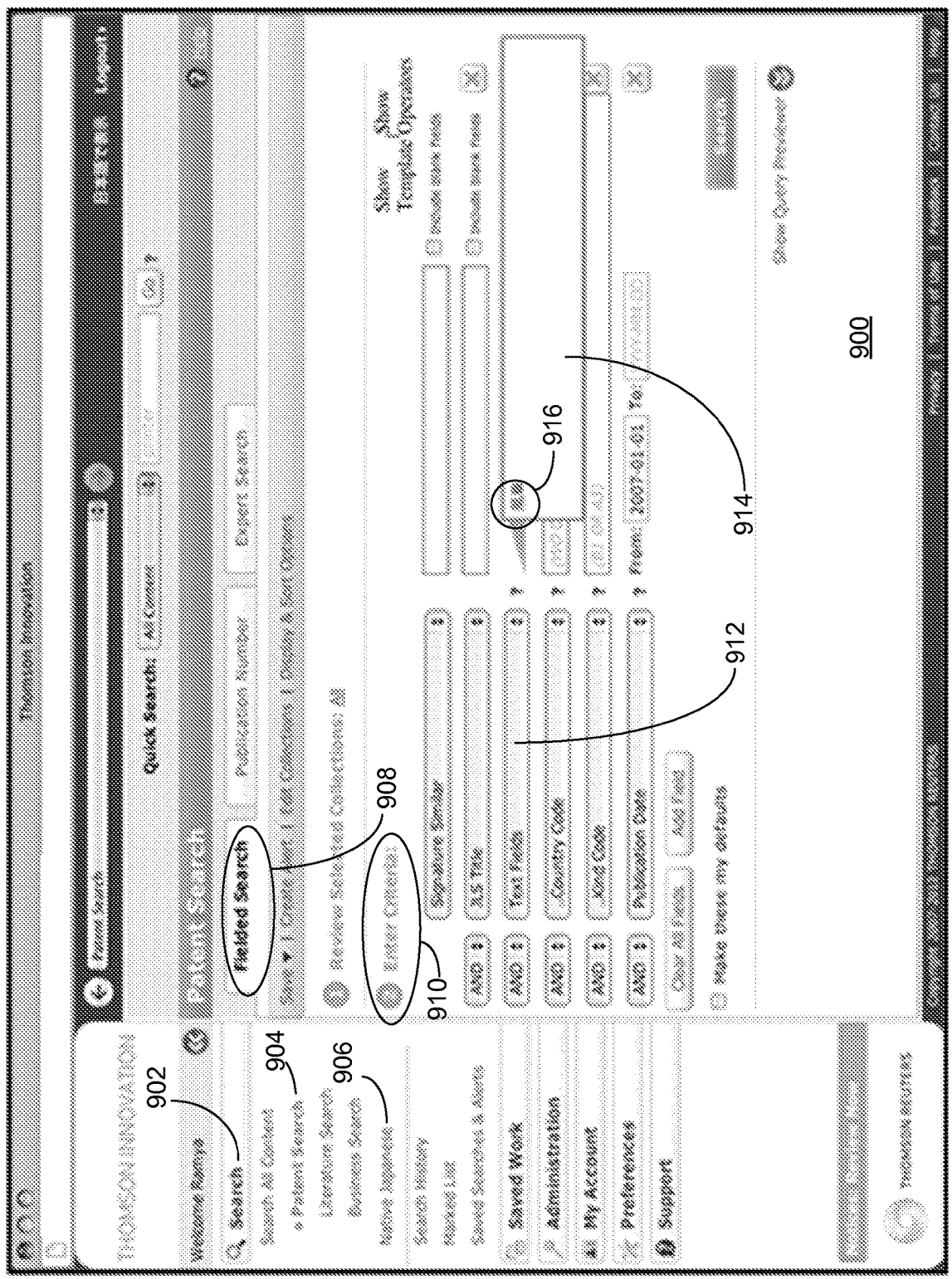
FIG. 9 is a screen shot illustrating an exemplary user interface "Fielded Search" screen related to the semantic search expansion and cross-lingual features associated with the present invention.

With reference to FIG. 9, a user interface screen shot 900 is shown with the Fielded Search tab 908 having the functionality described above. In this example, a user, for example a native Japanese language speaker or someone wishing to enter Japanese terms, enters non-English terms, e.g., Japanese terms 916, in text input box 914 related to search criteria text field 912. Note that the traditional navigation to the specialized Native Japanese search interface 906 is not needed here, as the general patent search interface 904 under the search function 902, enhanced with the present cross-lingual search-term suggestion invention, can accomplish the search given the Japanese search term and identify the relevant Japanese and non-Japanese documents by search against the many original, translated, and added-value fields in English that exist in the corpus—once the search-term suggestion mechanism here disclosed has provided the appropriate English search terms! Note that often searching in English produces better results than searching in other languages, given the broad prevalence of English in, or in association with, documents in other international languages. This is particularly true of Japanese, where written forms of a single familiar spoken term of technology, especially a term that is borrowed, are often fragmented across many alternate spellings, such that a searcher is in danger of missing a portion of the relevant documents for failing to include all these spelling variants in the search query. Accordingly, even a native Japanese-speaking user searching Japanese documents may benefit from use of English as an intermediate language via the present term-suggestion invention.

Figure 10:
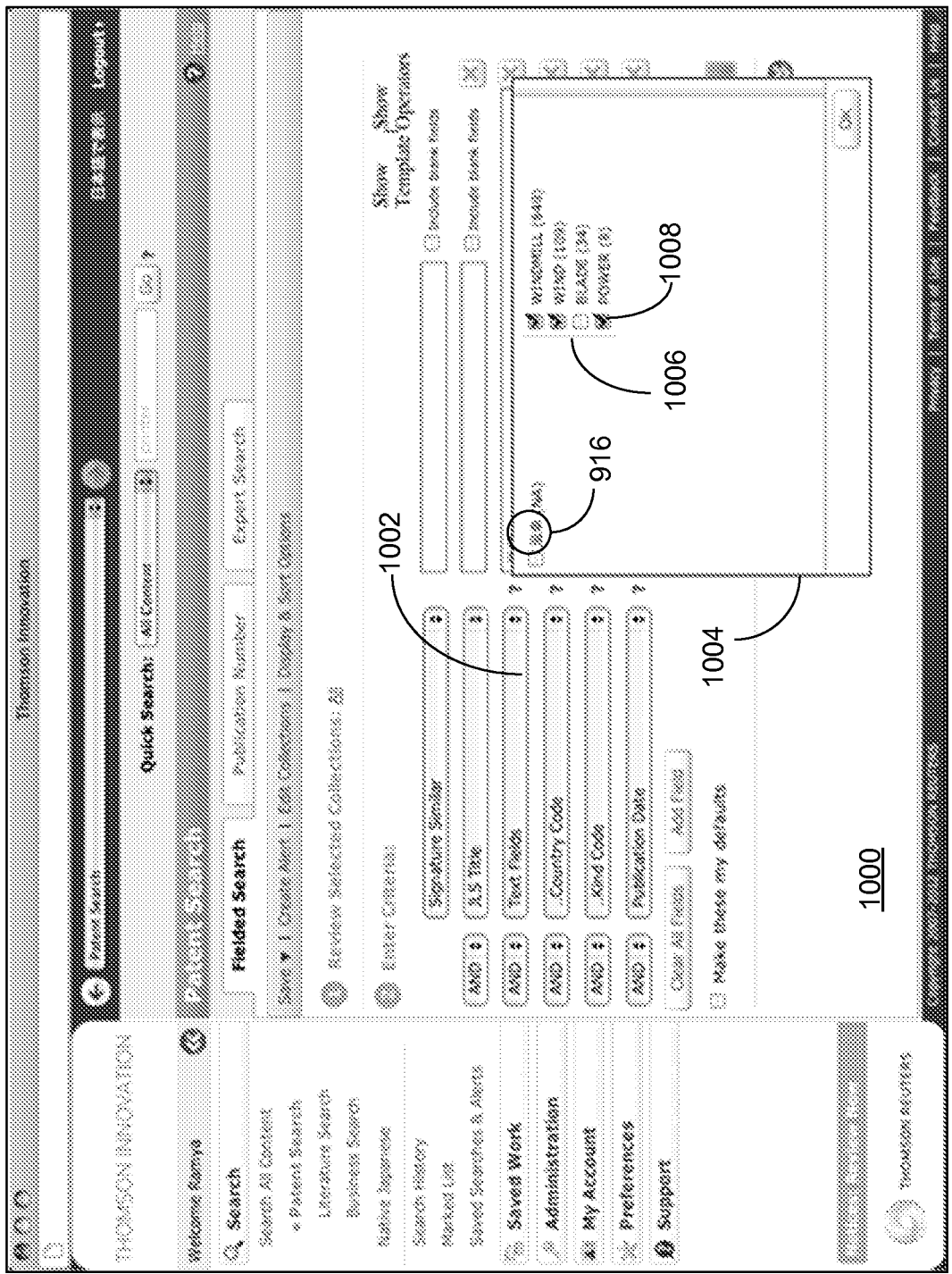
FIG. 10 is a screen shot illustrating an exemplary user interface screen related to the semantic search expansion, cross-lingual and term suggestion features associated with the present invention.

With reference to FIG. 10, a user interface screen shot 1000 is shown in which the system has generated and transmitted a sorted, scored list of search-term suggestions 1006 in English as a target language based on the source terms 916. User interface 1004 includes selection boxes 1008 to allow the user to select from the list of suggested target language terms to further process. In this example the user has selected the terms WINDMILL (849), WIND (109), and POWER (8) and not selected the term BLADE (34). The numbers in parentheses represent a scoring associated with the suggested term, informed by the statistical analysis of term frequencies in the sample results, obtained as described above. As shown a user may augment their search with traditional Boolean-based searching and/or with the "About these" semantic search expansion technique described hereinabove. In addition, the search process may also include using the relevance ranking invention also described above.

Figure 11:
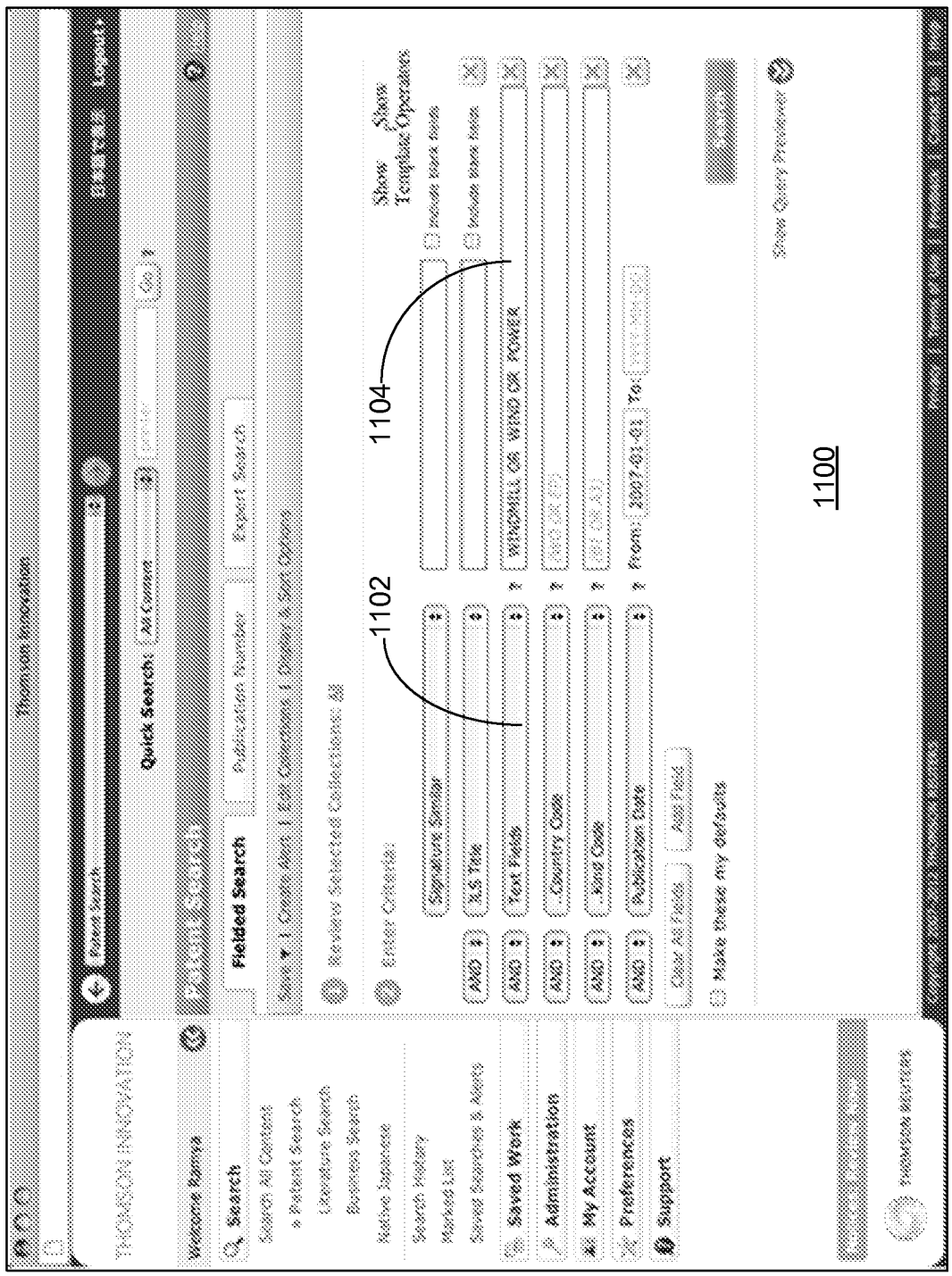
FIG. 11 is a screen shot illustrating an exemplary user interface screen related to the semantic search expansion, cross-lingual and term suggestion features associated with the present invention.

With reference to FIG. 11, a user interface screen shot 1100 is shown in which the selected set of suggested search terms, i.e., WINDMILL (849), WIND (109), and POWER (8), are placed into the user input search box 1104 related to the text field 1102. In this example the terms are shown having Boolean ORs as operative connectors, the reasonable choice for connecting alternatives, but subject to editing by the user, as shown in FIG. 12 and described following.

Figure 12:
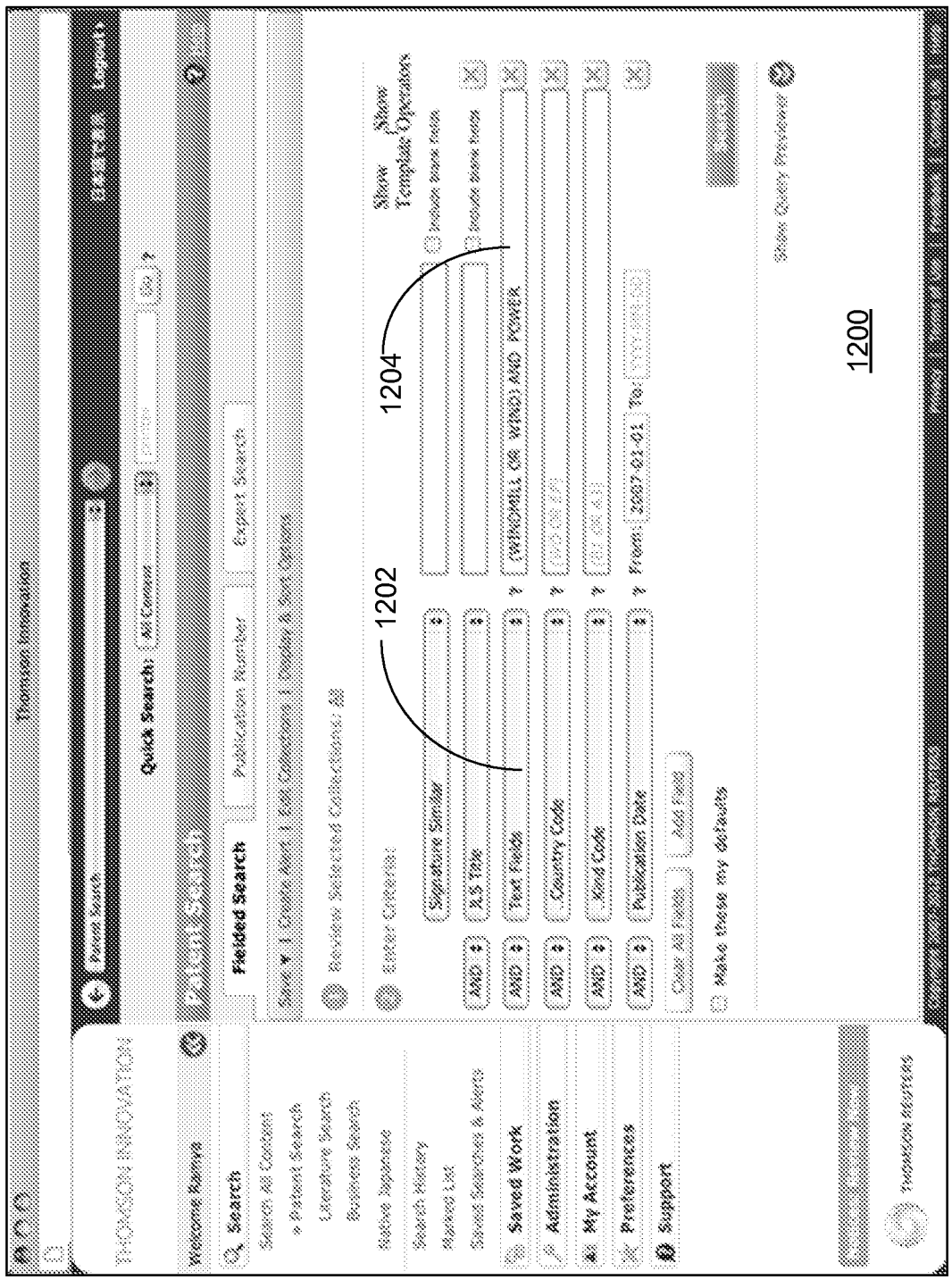
FIG. 12 is a screen shot illustrating an exemplary user interface screen related to the semantic search expansion, cross-lingual and term suggestion features associated with the present invention.

With reference to FIG. 12, a user interface screen shot 1200 is shown in which the selected terms WINDMILL (849), WIND (109), and POWER (8) are shown as being edited by the user to call for the ORed grouping of (windmill OR wind) further connected with the Boolean connector AND with the suggested term Power in search box 1204 related to search text field 1202.

Figure 13:
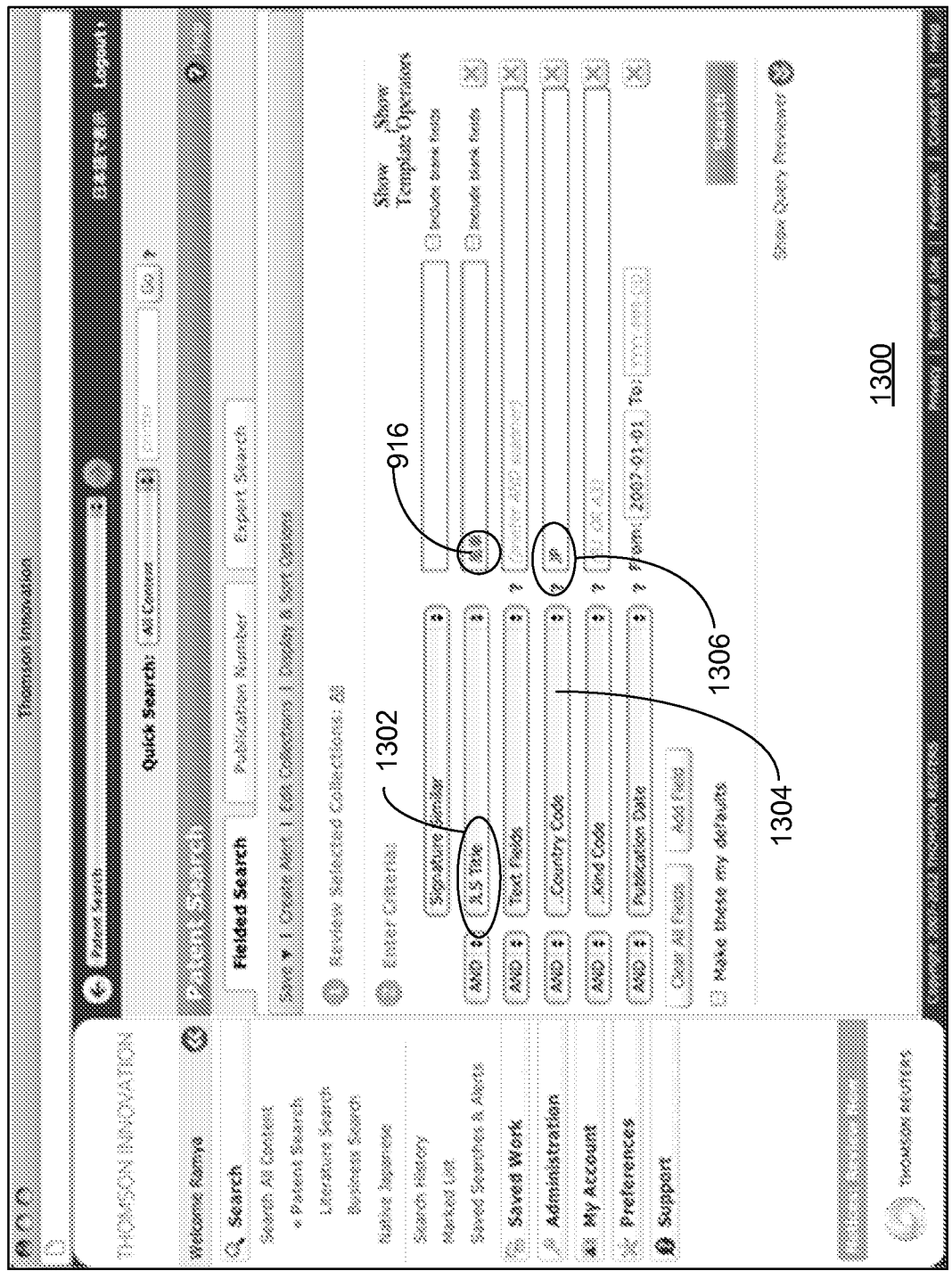
FIG. 13 is a screen shot illustrating an exemplary user interface screen related to the semantic search expansion, cross-lingual and term suggestion features associated with the present invention.

With reference to FIG. 13, a user interface screen shot 1300 is shown to illustrate an alternate embodiment of the cross-lingual invention wherein a user may input Japanese terms 916 into search criteria field JLS Title 1302. In addition, the user may input "JP" as indicating Japan in search criteria field Country Code 1304. In one manner of operation, the cross-lingual search system invention may process the search criteria so as to generate, automatically or semi-automatically (e.g., with user selection of suggested terms), English term suggestion or expansion that may then be applied against a corpus of English titles or other short field content-rich information to perform a search for responsive documents at least in part using English language terms. Often searching in English language produces better results than searching in other languages. Accordingly, even a native Japanese-speaking user searching Japanese documents may desire to use English as an intermediate search language. The invention allows such users to accomplish this solution.

Figure 14:
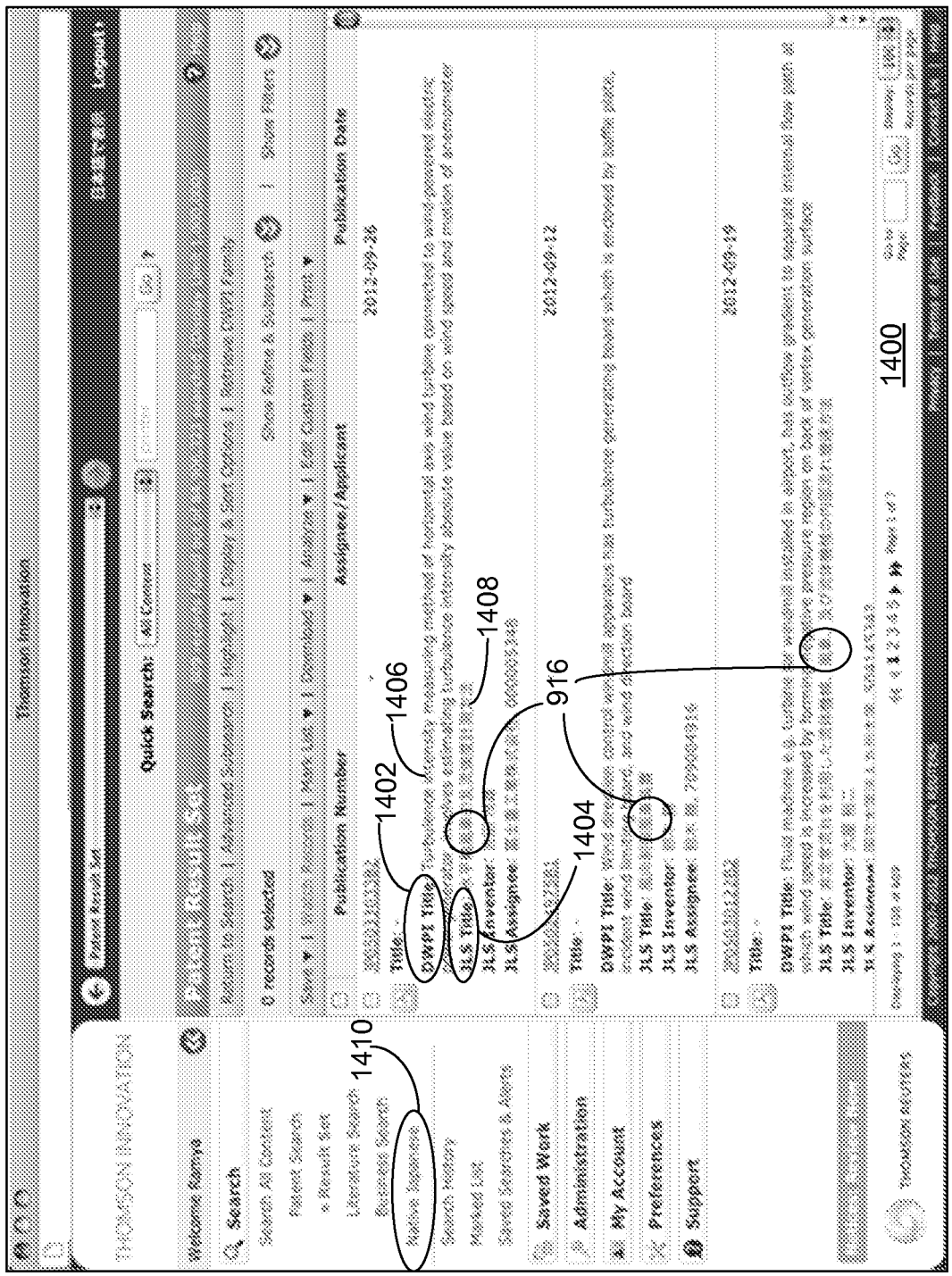
FIG. 14 is a screen shot illustrating a resulting set of documents related to the semantic search expansion, cross-lingual and term suggestion features associated with the present invention.

With reference to FIG. 14, a user interface screen shot 1400 is shown as an exemplary search result of the search criteria of FIG. 13. As shown, Japanese search terms 916 are found in three resulting documents. In this example, DWPI provides short field keyword or content rich service for searching non-English source documents (in this case Japanese patent documents) in English. Here the DWPI expression of the title of the document 1402 is in English and the JLS title 1404 is shown in the source Japanese terms. Again, separate navigation via function 1410 is rendered unnecessary by way of the cross-lingual invention.

Figure 15:
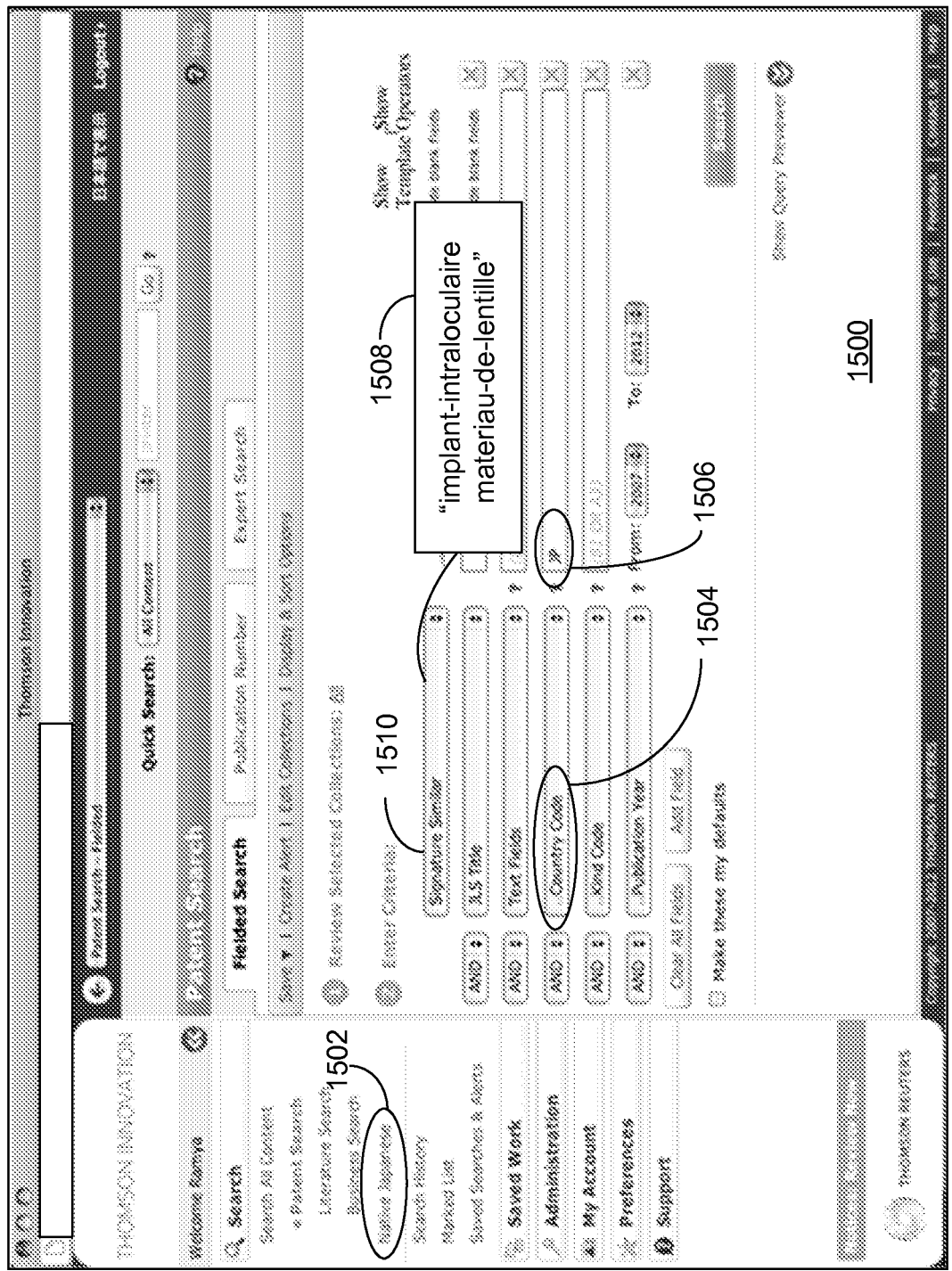
FIG. 15 is a screen shot illustrating an exemplary user interface screen related to the semantic search expansion, cross-lingual and term suggestion features associated with the present invention.

With reference to FIG. 15, a user interface screen shot 1500 is shown to illustrate a further example in which a user may enter non-English terms, in this case French terms "implant-intraloculaire materiau-de-lentille" 1508 in search criteria field 1510. The user may then enter JP (Japanese) in input box 1506 as the Country Code 1504 to indicate that the user is interested in searching Japanese documents. In this example, the cross-lingual invention takes as query two multiword terms in French in searching for responsive Japanese patent documents. That is, starting with French terms familiar to the user, the system works through English, this time entirely behind the scenes, to arrive at the documents of interest in Japanese. What is specially illustrated here is another embodiment of the cross-lingual search-term suggestion invention. Here the suggestion mechanism does not put up a panel of suggested English terms for the user to interact with. Rather, the cross-lingual suggestion facility is operating behind the scenes as the first phase in the more elaborate procedure here disclosed as invention (III), semantic expansion, earlier described briefly and described in detail below.

Figure 16:
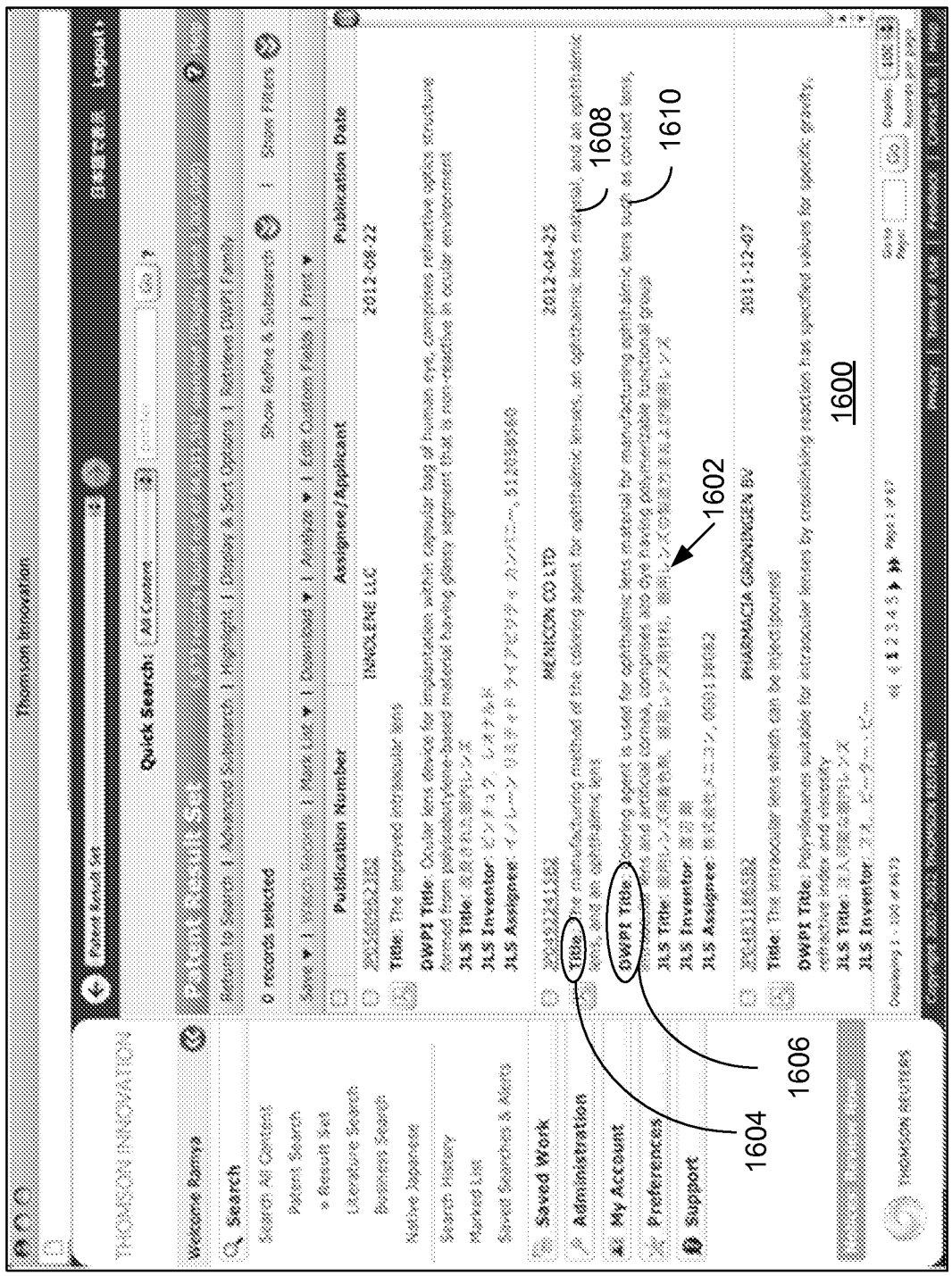
FIG. 16 is a screen shot illustrating a resulting set of documents related to the semantic search expansion, cross-lingual and term suggestion features associated with the present invention.

With reference to FIG. 16, a user interface screen shot 1600 is shown as an exemplary set of search results of the search criteria of FIG. 15. As shown, Japanese documents are found that have in their associated English title fields terms 1608, 1610 responsive to the entered French search terms. In this example, we see that DWPI provides keyword-rich title fields in English that, as attached to documents in a broad array of languages, provide an excellent source of English search-term suggestions whether one starts with terms in French, in some other non-English language, or even in English itself; and then provide excellent targets for search among documents in any of these languages, including Japanese, using just such English terms. However, it should be emphasized that the invention does not require the presence of DWPI data. Other titles, abstracts, and keyword fields can serve the same purpose. In the screenshot in the figure, the English translation of the title of the document and the DWPI title 1606 composed for the document are shown along with the "JLS title" 1602 in the original Japanese language. Again, this is all possible without navigation to the separate Japanese-language search and display function 1502.

III—Search Expansion/Query Modification Based on Initial Result Set

In unstructured data, in order to do semantic expansion "from scratch," without reference to dictionaries or thesauri, it is first necessary to process the text of the curpus so as to discover the term co-occurrence characteristics of the corpus. The semantic structure revealed by such statistical analysis must be represented and indexed to allow efficient access at query time. This can be done for patent data, as by latent semantic indexing, LSI. Two disadvantages we identify with this approach are (a) that a separate indexing infrastructure must be built and maintained; and (b) that, at least in its most straightforward use, LSI will not help with cross-lingual semantic relationships.

But with patent data it is not necessary to start from scratch. We show how effective semantic expansion can be accomplished just by using the existing indexing of the patent search system and taking advantage of language-independent metadata fields present in all the documents of the corpus. Additionally, we gain advantage by employing the inventions (I) and (II) presented above.

The invention (III) disclosed here is intended to operate in a search expander module 106 which is functionally intermediate between the search federator 105 and the underlying search services 110, as part of a cluster of services which we here refer to as the "search control services." Invention (II), the cross-lingual search-term suggester 108 described in the preceding section, also resides in this functional region, serving both to provide term-suggestion panels to the UI manager for the search application, but also to provide additional search terms for the semantic expander 106.

Semantic expansion needs to be integrated with Boolean search and other specialized search capabilities. The user should not have to sacrifice the clarity of traditional Boolean search when invoking semantic expansion. The invocation of the various kinds of search that may be required in processing a single request from a user is choreographed by the search federator 105. It must also process the scores returned by the separate searches it solicits, which may be executed on disparate systems, into the single assignment of ultimate document scores to govern the ranking returned to the user.

We disclose a method and system for semantic expansion, overcoming prior-art limitations of narrowing, with respect to the searcher's intention, of search results from text-term search queries, provided the data are "structured", i.e., multi-fielded, and include fields that are content-correlated but language invariant. Unwanted narrowing of search results typically arises from particular choices of language, particular variants of terminology within the language, and particular grammatical forms and spellings of terms from the terminology, both within the documents being searched and in the query terms submitted by the searcher, defeating the effectiveness of the standard text-string matching approach to identifying the documents of interest to the searcher. The method here utilizes the language-invariant fields available in the corpus in a multi-phase process to amplify the original text-term query with statistically derived metadata criteria.

Various rounds of analysis of intermediate results must happen in servicing a term-suggestion request coming from the search UI manager or from the semantic expander, and in a phase of semantic expansion following the term expansion, involving pseudo relevance feedback. These require a search-results analyzer 109 able to access and analyze field data for thousands of search results at high speed.

The lead-up to a typical invocation of semantic expansion begins with a user 101 of the search application interacting with a fielded search form or typing in query syntax. The request is interpreted by the search-request UI manager 102, which may do validations and entitlement checks, and if all is well passes the request to the search federator 105, 301. The complex search received may or may not have clauses querying an "About these" pseudo-field. It may have multiple such clauses. For any such clause found, work is delegated by the search federator to the semantic expander 106, 302.

The semantic expander expects, per invocation, to receive a sequence of search terms—as single-word or multiword phrases—to be expanded together. The terms are understood as the user's attempt to characterize her area of interest. These terms cannot be acted upon independently because the results, in their membership and ranking, must reflect the joint interest of the searcher in the multiple terms, as somehow identifying collectively a single direction of interest, yet without a strict stipulation that each and every term, or even its concept, be represented in the returned results. The usefulness of the returned results is highly contingent, then, on their ranking as based on the submitted terms and the user intention they suggest.

The first hurdle of the semantic expansion is the particularity of the form of each term submitted. In the first place, if a term is not in English, we wish to find English search terms that translate the submitted term or at least are very closely associated with the area it suggests. We choose English for patent search because English has the broadest representation in the world's most significant patent literature. United States patents are all in English. English is a major language of publication for patent documents published by the European Patent Office (EPO) and by the World Intellectual Property Organization (WIPO). Patents filed primarily in other languages may have English-language titles and abstracts provided by the respective patent offices. Furthermore, the Derwent World Patents Index (DWPI), provided by Thomson Reuters, adds English-language titles and other content for patent documents published around the world. We are, at this stage, making no presumption that all the documents that are of interest to the searcher in fact do have English fields that can serve as targets for search using English terms. We will continue to use the submitted term, in whatever language, in subsequent phases of the semantic expansion. But having English terms to use, in addition to the submitted term, early in the process helps get us the breadth we will need for the second phase of the expansion, the pseudo relevance feedback phase, to yield dependable results.

Beyond ensuring that we have at least some English terminology along with any foreign-language term, we also want to map less common English terminology or spelling to more common forms. But we do not want to get too broad with associated terms in this first phase, the keyphrase expansion phase, of the semantic expansion. Accordingly, 303 we invoke the cross-lingual search-term suggester 108 detailed here as invention (II), but use only the first few suggestions it provides. These suggestions populate a topicality focus spectrum of text-field queries, as explained in the discussion of invention (I). When this has been done for each submitted phrase separately, yielding a focus spectrum of four queries for each, all the queries of all these focus spectra are combined under a DOR operator and submitted 304 to the underlying search system 110, requesting a sorting by relevance. Given the topicality sensitivity built into the request by the techniques of invention (I), as discussed, the leading results in the ranking returned should be among the documents of the corpus most "about" the concepts behind the various terms submitted by the user. This is important because we will analyze only the first few thousand of the returned records and use the analysis to craft a further search query, an approach referred to as "pseudo relevance feedback," characterized by a dependence on the quality of the ranking returned from an initial search as a stand-in for (actual) user feedback identifying the best results.

The continuation of the expansion process turns on the presence of language-independent metadata fields in each patent record that are correlated with the content proper—i.e., the disclosed technologies—of those patents, and that are relatively reliably populated throughout the corpus. Fields containing classification codes, according to various schemes, are candidate fields. A field containing patent numbers of cited patents is also such a field. Other fields could be added to the list. The semantic expander solicits analysis 305, 109 of the top few thousand of the relevance-sorted results of the preceding expanded-keyphrase-query search in point of the frequency of their values for the chosen language-independent, content-correlated fields, such as IPC and cited patents.

The most frequent of the values for the metadata fields analyzed, with (a monotonic transformation of) their frequencies, are regarded as a "signature" of the patent documents most aligned with the interest expressed by the user through the sequence of search terms submitted in the "About these" clause being processed. Continuing the example of the preceding paragraph, choosing IPC-code and cited-patent fields as the metadata fields factoring into the signature, the semantic expander builds a new intermediate search request comprising: 1) the topicality spectrum queries crafted earlier from the phase-one search-term suggestion expansions of the original search terms entered in the present "About these" request clause, which queries were used in phase two to obtain the results analyzed for the pseudo relevance feedback; 2) a query each for the most frequent values of full IPC codes and for the most frequent coarsenings of the found IPC codes to group-level codes, each query weighted by (a transformation of) the frequency determined for that code in the analysis; and 3) a query each for the most frequently cited patents, similarly weighted by (a transformation of) the frequency determined for that cited patent in the analysis.

Thresholds for the count of values to regard for each of the metadata fields and for their frequency prominence must be determined experimentally. The typically large array of resulting queries are submitted under a WOR operator to the underlying search system.

The results returned for this keyphrase-plus-metadata-signature search are not the end of the story. They are only a relevance-scored intermediate result, for the particular "About these" request clause, to be returned to the search federator 105, which will then govern the interoperation of these results with the remainder of the complex search request, possibly involving further appeals the semantic expander 106, appeals to other specialized request-clause processors 107, and appeals directly to the underlying search system 110 responsible for processing standard patent-search clauses.

It is essential to be able to process large sets of results for such "About these" clauses, as the request as a whole may constrain the ultimate results for the user by other criteria, so that the truncation of the intermediate results could result in anomalies if the ultimate results are not especially numerous but are mysteriously lacking particular documents that were trimmed off of large intermediate results. This is an issue not specific to semantic expansion, but rather a general concern in search federation.

Specifics relating to embodiment of these inventions in a search system for patent data have been provided for concreteness and clarity. Those skilled in the art will realize that the inventions are not confined in applicability to the patent domain, and in fact are directly pertinent to corpora of structured data with fields having the essential properties explained in the discussion of the three inventions. Search systems for corpora of structured documents in the scientific, medical, and legal fields are natural additional examples of settings for application of these inventions.

In one exemplary manner of operation, the search results of step (a) above are then analyzed with respect to their language-invariant, content-correlated fields, producing tallies of the occurrences of different values in those fields. The value tallies for those fields contribute to a "signature" of the content of interest to the user, as based on the sample obtained in step (a), the signature to be the basis for the query expansion or modification or amplification of step (c). At step (c), the tallies obtained in step (b) are used to inform weighting of additional search criteria. For each of the most prevalent values (configurably defined) of the language-invariant fields, a search criterion is formulated to stipulate that the value be found in that field. The new criteria are appended to the original text-term search criteria with WOR as the connective and with weights determined by the tallies obtained from the sample in step (b). (Values occurring more frequently in the sample results of step (a) are given more weight in the criteria for the signature search than less frequently occurring values.) This amplification of the original query expresses to the search system the signature being sought, which signature may be identified in the corpus even in documents that do not satisfy the original text-term search criteria. The differential weights provided induce the search system to return results that are scored in good correlation with the user's interest.

At step (d), the results of the large WOR of disparate criteria are generally very numerous, trailing off in relevance to the user as they are brought in by only very few of the search criteria, with ever fewer match occurrences. The method cuts off the result by a combination of threshold considerations involving number of results and scores.

In accordance with the present invention, a computer-based system is provided with instructions implemented to improve document/record search and retrieval systems such as Thomson Reuters Thomson Innovation service. By applying one or more of the inventive search features described herein, the system provides a processing framework for semantic expansion in document search and retrieval. Although discussed herein largely in terms of application in the area of patent search systems, the invention has broad applicability as is not limited to patent search applications. The objective from the user's perspective may further illustrate the semantic expansion process, which is intended to allow a user to find, for example, patent documents "about" a particular technology or the convergence of multiple technologies as suggested by a series of entered words and phrases. One goal of the system is to process user queries with the enhanced search techniques without the user needing to be specific regarding the inclusion or exclusion of the very words entered to suggest the technologies. Ideally, the scoring of the results should vary monotonically with the user's interest. Choices among variant spellings, synonyms, or even languages of the entered terms should perturb the results as little as possible.

In one manner of operation, the three inventions described herein are combined into a cross-lingual/semantic expansion/relevance ranking approach involves three search phases with analysis of the results of each. The semantic expansion search functions from the user's perspective as an integral component clause of what may be an arbitrarily complex Boolean composite of components. Each such component may query standard or custom fields or may even be another semantic expansion. The user initiates a semantic-expansion clause by entering search terms, whether single words or multiword phrases, into an "About these" field on a user interface search entry box(es) or form. Preferably the system is capable of receiving and processing search terms in multiple languages for processing and comparing for matching documents or records or portions comprised of text in more than one language and in any language for which the database(s) includes searchable patent data. For example, databases may include Latin-1-written European, Japanese, Chinese, and Russian languages (e.g., indexed corpus of Russian-language patents.) Phrases may be arbitrarily long, although typically phrases of three words or less will be entered and one- or two-word phrases generally suffice. This is particularly the case where up to ten words or phrases are entered at once in a single semantic-expansion clause. The results, regardless of the language(s) of the terms supplied by the user, may potentially be from any authority and any language of filing.

In one manner of implementation, semantic search expansion may include an iterative query-development search methodology. In keeping with the present invention, iterative query development is simplified as compared to prior approaches. The user enters one or two words or phrases and then inspects the results. In an iterative fashion, the user can observe and correct misdirection apparent in the results simply by adding additional words or phrases, effectively nudging the results into better focus on the intended technology that is the intended subject of the search. This approach is dramatically different and improved when compared with a user's perennial dilemma associated with Boolean searching. For instance, in Boolean searching when presented with less than desired search results the user must decide whether and how to elaborate the criteria. One problem with corrective action in the Boolean approach is that additional terms combined via AND may knock out perfectly desirable results while combining them via OR may admit a flood of undesired results, and considering also that failure adequately to consider variant forms may easily produce misleading results.

The semantic search expansion approach enhances user experience. For instance, this new approach may rely entirely on existing patent-search indices. The system does not require any special processing on incoming new documents and does not need to consult dictionaries or thesauri. Instead, the present approach utilizes the wealth of cues already available in the bibliographic data supplied by existing patent databases or authorities, including, e.g., enhanced Derwent DWPI data. In operation, special processing is done only at request time, e.g., in phases as follows: enhancing/Anglicizing the submitted list of search terms; searching for sample hits for the search terms, from which we extract a query signature; and searching for the best matches for the signature. This can be related to the customary structure of semantic expansion, involving: at load time, determining useful attribute-vector dimensions—"concepts"—and associating a particular vector in the space with each document as its signature; at search time, associating an attribute vector with the user's query as the desired signature; and searching for the documents "nearest" to the query, in terms of their respective signatures, according to a chosen metric in the attribute-vector space.

In this manner, and in contrast to prior approaches, the present semantic search expansion approach here takes advantage of prior and existing automated and human efforts previously applied in developing classification systems, e.g., proprietary Derwent DWPI data. In this manner the present approach avoids the special load-time processing. The system can perform ordinary scored weighted-OR searching against fields previously indexed to rank results by relevance to the user's query, thus avoiding special query-time metric-space search. Furthermore, the system executing the present approach is able to bridge language barriers with more efficiently.

The following describes the three phases of performing semantic search expansion with a exemplary data sets. Posit a user who seeks patents about ice cream freezers—for production, storage, dispensing? The focus can be improved later—but the user happens to know only the Italian word "gelato" for ice cream and the German word "Gefrierschrank" for freezer. The user enters these two terms in the text input box for the pseudo-field "About these" on the user interface search input form, e.g., text field 502/504 of input form 500 of FIG. 5.

Phase one of the present semantic search expansion involves enhancing/Anglicizing the search-term list so as to create a "fulltext" or "keyword" signature. In the initial phase, the system receives the user input search terms and identifies the best English search terms to use along with those provided by the user—whether English or not, e.g., Latin-1-written European language and Japanese. This phase yields helpful results even for English terms. It testing, the system is found to run this phase one in under two seconds per term/phrase, yielding translations and strong correlates all of which help in searching English-language patent data. In this manner the system extracts good English search-term suggestions language independent of the language of the user entered search query. This phase may be broken out into a separate service that the user may invoke directly to arrive at search terms to use against any standard descriptive field. The user intending to search the detailed descriptions in US patents, for instance, may enter a term or phrase in Portuguese or in Japanese, and call up an array of English search-term options from which to select. The selected options are then OR-ed and replace the entered term or phrase. For example, see the English suggestion box 1004 and set of four suggested terms (windmill, wind, blade, power) 1008 and selection boxes 1006 of FIG. 10.

Phase one of the present semantic search expansion involves searching in the non-English title fields of patent documents that also carry an English first-level-data title or a Derwent DWPI title. The English-language titles are extracted from the result records and their single words and two-word "phrases" (pairs of successive words with no regard to grammatical organization) are tallied. The raw tallies are processed into scores that take into account the background frequency of the terms/phrases among the English titles of patents in general, penalizing terms accordingly as they are frequent in the large background corpus. This is done separately for each entered term or phrase.

For example, when invoked independently as a search aid in itself, the term-suggestion process for the entered term "gelato" returned the following tallies: 575 for ICE CREAM; 276 for CREAM; 143 for ICE; and 7 for MACHINE. In testing, similar results were returned for entered terms meaning ice cream from many other languages, even though the number of records applied in testing varied considerably. For instance, the French word "glacée" returned: 493 for ICE CREAM; 227 for CREAM; 179 for ICE; 63 for CONFECTION; and 37 for FROZEN. Very similar results even though there were seven times as many records. In another example, when invoked independently on the entered German term "Gefrierschrank", the term-suggestion processing returned: 519 for FREEZER; 299 for FREEZER CABINET; 130 for REFRIGERATOR; 38 for CABINET; and 14 for DOOR.

However, the present semantic search expansion is restrictive in use of these term suggestions. For each entered term or phrase, the high-scoring end of its phase-one output is processed into two OR-ed sets—by ordinary Boolean OR, not weighted OR—to be used in searching four strata of text fields in the patent documents, namely: titles (all languages as supplied by the patent authorities), Derwent title; abstracts (all languages as supplied by the patent authorities), Derwent abstract; claims (all languages as supplied by the patent authorities), Derwent claims; and non-patent citations, drawing descriptions, Derwent drawing descriptions, background and summary, detailed description (original and our English translation).

Stratifying the text fields into four levels or strata rather than searching in one concatenation of all fields allows the system to combine the separate stratum criteria by weighted OR, thereby allowing scoring that better matches the user's intention. Occurrences of the terms in more strata will yield higher scores than the same number of occurrences in fewer strata, as perhaps in the description fields alone. The scores are then a better measure of whether the documents are "about" the (referents of) the entered terms, accordingly as the patents either: introduce a technology or build on it as an essential component, yielding occurrences in abstracts and perhaps even Derwent title, if not original title; or involve the technology sufficiently for it to be referenced in some claims, even though not mentioned in titles or abstracts; or reference the technology perhaps only incidentally or in presentation of the background, yielding occurrences in the description-level fields only.

Two exemplary versions of the enhanced search-term list are 1) a more restricted version aimed at the broader two strata (fields) of claims and descriptions; and 2) a more liberal version aimed at the leaner two strata of titles and abstracts. The title and abstract strata involve much less text, and so the system brings in relatively greater numbers of results than when searching the claims and descriptions strata or fields. It is more likely to have misdirection with hits in the large claims and descriptions fields when being too liberal with alternatives. Accordingly, the system applies a tighter focus in the keyword searching against these text-heavy strata. For example, the semantic search expansion system includes the term "REFRIGERATOR" along with "Gefrierschrank" and "freezer" when searching titles and abstracts, but not when searching claims and descriptions (although in this case "REFRIGERATOR" should not be especially distracting). This is true for the terms GELATO, ICE CREAM, and CREAM in the example below. CREAM is included in the title and abstract subquery searches and left out of the claims and description subquery searches—See Table 3 below.

Phase two of the present semantic search expansion involves deriving a bibliographic signature. This second phase uses the enhanced search-term list developed in phase one in a search against the multiple strata of text fields, as explained, to collect a representative sampling of text hits from which to harvest a "signature" for searching beyond strict occurrence of the entered search terms or even of the additional terms discovered in phase one. In this manner the enhanced search system conceptually captures the user's intended subject of interest. In operation, the system fetches a relatively small sample of records satisfying the key phrase criteria developed in phase one. The size of the sample may be tunable, e.g., 2000 records likely sufficient, to optimize effectiveness. The system then analyzes the phase-two search results for the most frequently occurring values in predefined bibliographic fields that characterize the technology itself, e.g., IPC classification codes and patent citations. Other fields, such as DWPI manual codes, may be considered to this end. Also, the phase-two results may be reduced to one per Derwent DWPI family to avoid skewing statistics toward patents/inventions that happen to have been filed with more authorities or have been published in more publication stages.

The value tallies, together with various empirically calibrated numerical parameters, govern the weight assignments given to the values in comprising the complete signature. If a user's interest is broad and the system tallies classification codes at the narrowest level, value tallies may be fragmented to the point that their relative prominence may not be valuable. On the other hand, if the user's interest is narrow and the system tallies classification codes at a broad level, the result is likely to fail to discriminate the really well-targeted hits from those that are in technological areas neighboring the one the user has attempted to specify. One way to resolve this operational problem is to process IPC classification codes separately at two levels of specificity, the class level and the subclass level. In the present example the subclass level is the one that is most useful in discrimination while the class level is strongly dominated by the single class A23G0009. A cited patent may be highly relevant to the user's interest, but stands to score more poorly than other patents simply because it does not cite itself. One way the system counteracts this is by assuming or pretending, in effect, that the cited patents do cite themselves and thus the cited patent counts with the same weight as citing that patent.

Phase three of the present semantic search expansion involves finding and ranking matches for joint keyword-bibliographic signature. The bibliographic signature developed in phase two is combined with the fulltext or keyword or keyphrase criteria developed in phase one (and used in phase two) to produce a weighted-OR search query, shown below with annotation. A threshold score is applied: results with scores below the threshold are discarded. Whereas no collection or date criteria were stipulated in phases one and two, a optimization routine processes the collection and date criteria of the user's request as a whole applied in the phase-three search of this semantic expansion. As discussed above results were limited in phases one and two to a relatively small sampling, on the order of 2000 records, in phase three the system is configured to return far greater numbers of results, even millions of results. The larger result set it necessary for Boolean operations with other component queries not visible to this semantic-expansion processing.

In an exemplary annotated phase-three search query, subqueries within the phase-three search are in three groups, respectively searching for keywords, classification codes (at two levels), and patent citations.

Table 3 reflects Keyword subqueries group:

TABLE 3

| | |
|---|---|
| seq="1" wt="100" | title=("GELATO" or "ICE CREAM" or "CREAM") |
| seq="2" wt="100" | abstract=("GELATO" or "ICE CREAM" or "CREAM") |
| seq="3" wt="100" | claims=("GELATO" or "ICE CREAM") |
| seq="4" wt="100" | description=("GELATO" or "ICE CREAM") |
| seq="5" wt="100" | title=("GEFRIERSCHRANK" or "FREEZER" or "REFRIGERATOR") |

TABLE 3-continued

| | |
|---|---|
| seq="6" wt="100" | abstract=("GEFRIERSCHRANK" or "FREEZER" or "REFRIGERATOR") |
| seq="7" wt="100" | claims=("GEFRIERSCHRANK" or "FREEZER") |
| seq="8" wt="100" | description=("GEFRIERSCHRANK" or "FREEZER") |

Table 4 reflects IPC subqueries, subclass-level:

TABLE 4

| | |
|---|---|
| seq="9" wt="35" | IPC=(A23G000922) |
| seq="10" wt="33" | IPC=(A23G000932) |
| seq="11" wt="30" | IPC=(A23G000928) |
| seq="12" wt="24" | IPC=(A23G000912) |
| seq="13" wt="24" | IPC=(A23G000904) |
| seq="14" wt="23" | IPC=(A23G000920) |
| seq="15" wt="16" | IPC=(A23G000952) |
| seq="16" wt="16" | IPC=(F25D001102) |

TABLE 4-continued

| | |
|---|---|
| seq="17" wt="15" | IPC=(A23G000900) |
| seq="18" wt="14" | IPC=(A23G000944) |
| seq="19" wt="14" | IPC=(A23G000916) |
| seq="20" wt="10" | IPC=(A23G000948) |
| seq="21" wt="9" | IPC=(A23G000942) |
| seq="22" wt="9" | IPC=(A23G000910) |
| seq="23" wt="8" | IPC=(F25D001706) |
| seq="24" wt="8" | IPC=(F25D001100) |
| seq="25" wt="7" | IPC=(A23G000950) |
| seq="26" wt="7" | IPC=(A23G000946) |
| seq="27" wt="7" | IPC=(A23G000914) |
| seq="28" wt="6" | IPC=(A23G000934) |
| seq="29" wt="6" | IPC=(F25D001704) |
| seq="30" wt="6" | IPC=(F25D002900) |
| seq="31" wt="6" | IPC=(A23G000930) |
| seq="32" wt="6" | IPC=(F25D002302) |
| seq="33" wt="6" | IPC=(F25D001708) |
| seq="34" wt="5" | IPC=(A23G000908) |
| seq="35" wt="5" | IPC=(F25D002300) |
| seq="36" wt="5" | IPC=(A23G000924) |
| seq="37" wt="5" | IPC=(F25D002500) |
| seq="38" wt="5" | IPC=(F25C000100) |

Table 5 reflects IPC subqueries, class-level:

TABLE 5

| | |
|---|---|
| seq="39" wt="35" | IPC=(A23G0009) |
| seq="40" wt="5" | IPC=(F25D0011) |
| seq="41" wt="4" | IPC=(F25D0023) |
| seq="42" wt="4" | IPC=(F25D0017) |

Table 6 reflects patent-citation subqueries:

TABLE 6

| | |
|---|---|
| seq="43" wt="15" | patent_number=(JP1291751A) or patent_citee=(JP1291751A) |
| seq="44" wt="13" | patent_number=(US6082120A) or patent_citee=(US6082120A) |
| seq="45" wt="12" | patent_number=(US4758097A) or patent_citee=(US4758097A) |
| seq="46" wt="11" | patent_num ber=(US6082130A) or patent_citee=(US6082130A) |
| seq="47" wt="11" | patent_number=(US3803870A) or patent_citee=(US3803870A) |
| seq="48" wt="11" | patent_number=(US5403611A) or patent_citee=(US5403611A) |
| seq="49" wt="11" | patent_number=(US5620732A) or patent_citee=(US5620732A) |
| seq="50" wt="11" | patent_number=(JP10327760A) or patent_citee=(JP10327760A) |
| seq="51" wt="10" | patent_number=(US4881663A) or patent_citee=(US4881663A) |
| seq="52" wt="10" | patent_number=(US4703628A) or patent_citee=(US4703628A) |
| seq="53" wt="10" | patent_number=(US3780536A) or patent_citee=(US3780536A) |
| seq="54" wt="10" | patent_number=(US4463572A) or patent_citee=(US4463572A) |
| seq="55" wt="10" | patent_number=(US3146601A) or patent_citee=(US3146601A) |
| seq="56" wt="9" | patent_number=(US4332145A) or patent_citee=(US4332145A) |
| seq="57" wt="9" | patent_number=(US4500553A) or patent_citee=(US4500553A) |

With respect to the subquery for Wrap-up OR of the weighted subqueries: seq="58" rankby="1-57": 1 or 2 or 3 or 4 or 5 or 6 or 7 or 8 or 9 or 10 or 11 or 12 or 13 or 14 or 15 or 16 or 17 or 18 or 19 or 20 or 21 or 22 or 23 or 24 or 25 or 26 or 27 or 28 or 29 or 30 or 31 or 32 or 33 or 34 or 35 or 36 or 37 or 38 or 39 or 40 or 41 or 42 or 43 or 44 or 45 or 46 or 47 or 48 or 49 or 50 or 51 or 52 or 53 or 54 or 55 or 56 or 57.

Figure 4:
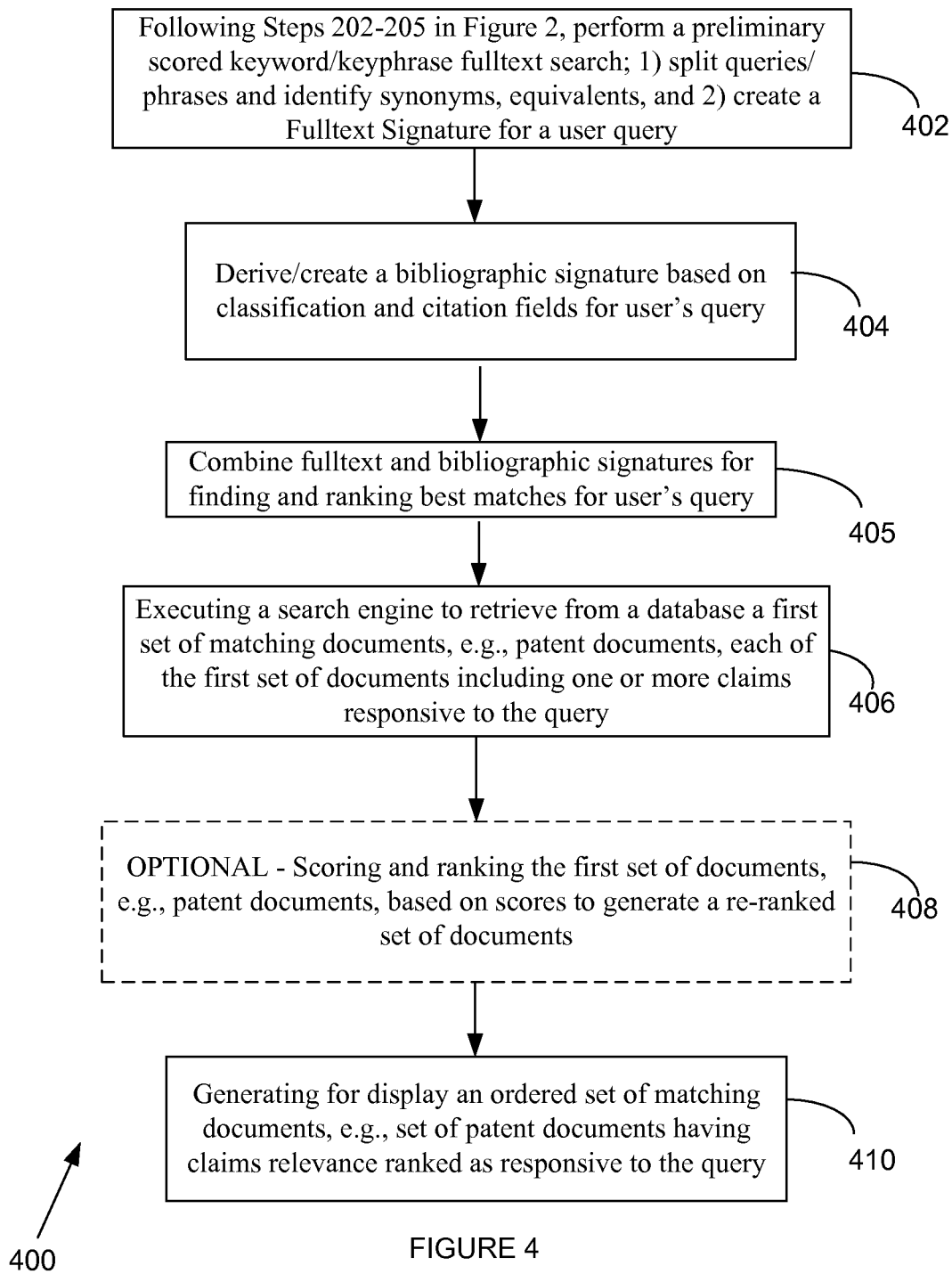
FIG. 4 is a search flow diagram illustrating an exemplary method of implementing the search expansion and query modification invention in the exemplary context of a patent search system.

FIG. 4 represents an exemplary document search and retrieval method or process 400 in accordance with the present invention. At step 402, the system enhances an entered set of query terms in manners described herein and creates text criteria associated with the user's query. At step 404, the system creates a bibliographic signature for the user's query. At step 405, the system combines fulltext criteria and bibliographic signatures into a combined search structure designed to enhance finding and ranking a set of best matches for the user's query. At step 406, the system applies the combined search structure and executes a search engine to retrieve from one or more databases a first set of matching documents, e.g., patent documents. For example, in the case of a patent database search, each of the first set of patent documents includes one or more fields of content responsive to the query.

At step 408, the system optionally performs a scoring or ranking process to order the set of match results. For example, and in the context of a patent document search, the system scores a first set of patent documents to generate a ranked or re-ranked set of patent documents. Relevance Ranking, as described in detail elsewhere herein, may be applied in a way to focus the search on the area of most interest to the user. For example, if the user enters a query directed to find patents having claims with certain subjects, the system, rather than simply returning a set of matching documents comprised of documents having an exact Boolean match for a given term, e.g., "dynamic random access memory", may first enhance the search terms, supplement search criteria or signature based on concept or on preliminary subset search analysis, and then rank the set of match results based on component query. In one manner of operation, the system may relevance rank based on a predefined scoring or weighting structure or algorithm. In one alternative, the system may be configured on the fly to score the component queries to best "fit" the search to a set of user parameters. For example, the user may be most interested in finding patent documents having terms within the specification for identifying prior art teachings. On the other hand, the user may be more interested in searching patent documents from an infringement perspective and may therefore be more interested to find patents that have certain terms, or related subject matter, in the claims and not as concerned with the specification. Accordingly, the system may be adapted to reconfigure its relevance ranking process so as to weight more or less the various component queries based on a user input beyond the query terms. At step 410, the system generates and communicates to the user remote device a signal representing the set of matching documents for display at the user device. For example, a search for patent documents responsive to a user query will lead to an ordered list of claims or patent documents from the ranked or re-ranked set of patent documents responsive to the query. As described elsewhere herein, the system may present the user with additional options such as by user interface screens to perform additional actions on the search and or resulting set of match documents.

Figure 5:
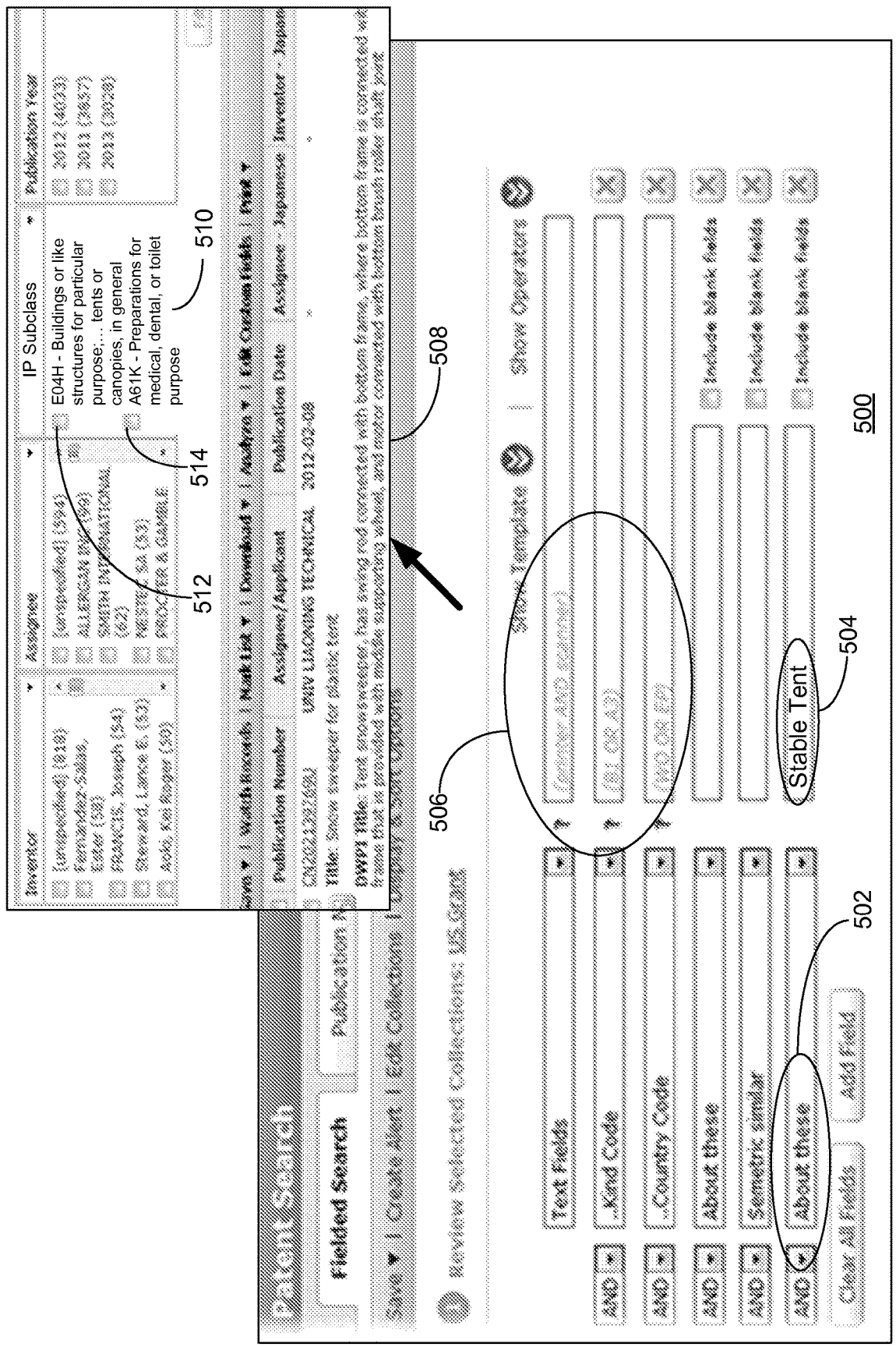
FIG. 5 is a screen shot illustrating an exemplary user interface screen having a set of fields for inputting query data used in processing one or more of the present inventions.

For example, and referring to the screen shot of FIG. 5, users may construct queries that include, in addition to the search expansion field, e.g., "stable tent" 504 in "About These" field 502, additional query terms and connectors, e.g., 506, concerning fields such as text, country and kind, to particularly limit or enhance importance of other terms such as those listed above. In this manner a user could, for example, search based on the present invention as well as narrow the responsive set of patent documents to those related to a particular assignee, inventor, IPC or other classification, date range, issue date, etc. In this manner the set of candidate patent documents yielded by the search engine used to process the queries may be reduced or particularized to suit the user's particular search needs or goals. In an alternative manner, the system may be configured to allow a user to input and configure the system so that the re-ranking module delimits or weights certain patent related fields, such as those listed above, or delimit or weight features associated with patent related fields in a re-ranking process.

FIG. 5 represents an exemplary user interface 500 for receiving search criteria and terms to apply against a patent database of documents or records or indexes. In this example the database selected is "US Grant" publications or records and the field selected is "About these" field 502. Here the user has input the term "fertilizer" in the search field 504. As shown in shaded gray, examples of terms with Boolean connectors are shown 506 but these are not user entered search terms—merely for reference. In one manner of operation, an enhanced or Semantic/Signature search in the context of this exemplary patent search flows as follows: supply each search term into an OR-ed set; preliminary scored keyword search using term expansion; derive bibliographic signature based on the classification and citation fields; run search for matches on the bibliographic and text signature; and deliver ranked result set.

In operation, a user inputs search terms in a selected search field, in this case "About these" search-form field, along with all the other search-form fields. One alternative descriptor for such a search field is "Signature similar." In the context of the present system and search field, "About" means that entered search terms need not themselves occur in the results. In one manner of operation, up to 10 single-word or multiword search terms may be accepted in any one instance of a selected field. Additional instances may be added. The system preferably applies search terms as input by the user or as further processed and applied to any language represented in patent data stored in the collection of documents or records. The system interacts normally via Boolean operators with other fields by combining as specified with all the other fields. Further, in operation the search is performed on the fly with nothing to maintain as new patent data are loaded.

In this manner, the enhanced patent search system receives a user input search query or set of terms and performs a semantic expansion of the search by modifying the original search term(s). With respect to FIG. 4, in Step 402 the system enhances the search terms and creates "fulltext" signature for user's query. Next in Step 404 the system creates a bibliographic signature for the user's query. At Step 405 the system combines fulltext and bibliographic signatures for finding and ranking best matches for user's query. Finally, the system executes a search and retrieval process/engine 406 and yields a results set of scored matches at step 408 for storing and/or presenting/displaying to a user at step 410. One goal is to allow a user to find patent documents about particular technologies that are identified based on a user query but not limited to the particular terms entered. The system analyzes a user's query and enhances or modifies the query using spelling variants, synonyms, or even terms from different languages. In particular, and as described in detail below, a native speaker in Japan or France or Germany may enter terms in their native language and the system may augment the search query by including in the search English counterparts to the terms entered. This is particularly useful where databases store documents or records comprising text in more than one language. In this manner the system automatically creates a new search identity to account for different languages and that can match more directly documents based on language. The approach is cross-lingual. User can enter terms on any language for which text is available in the system or for which a cross-reference of terms or meanings or synonyms is available. In this way the system identifies and delivers documents that match a user's query semantically—i.e., the documents do not have to match the query exactly as in a traditional Boolean search.

In addition, the system ranks the matching document set based on an understanding of the user's interest. The patent-search system includes an algorithm comprising the following major steps: enhancing the search-terms and creating fulltext signature for user's query; creating a bibliographic signature for user's query; and combining fulltext and bibliographic signatures for finding and ranking best matches for user's query.

More particularly, the enhancing semantic search approach operates as follows. Step 402—One exemplary method of enhancing search terms begins with splitting queries into component parts, e.g., phrases/terms, and finding synonyms and equivalents, e.g., English equivalents in connection with non-English terms, for each component part—phrase/term. Next, the enhanced search method creates a fulltext signature. The processes of FIG. 4 are described in more detail as follows.

Figures 6, 7:
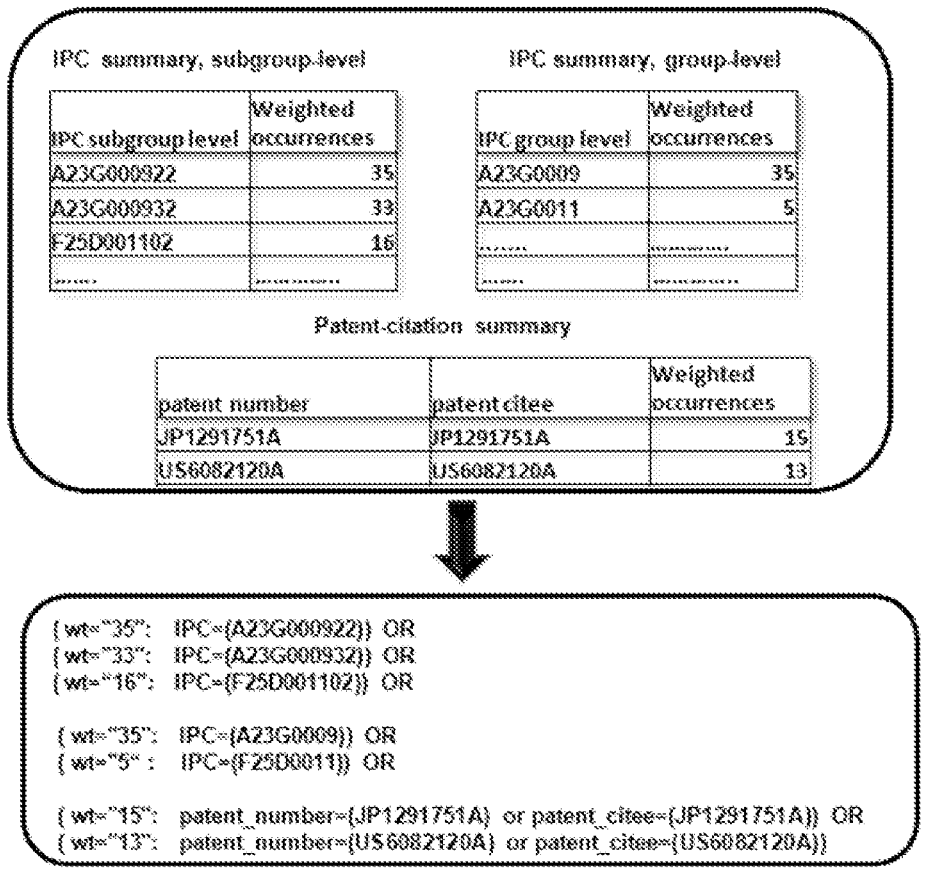
FIG. 6 is a data table and exemplary weighted search representation of patent field processing in connection with the present invention.
FIG. 7 is a further exemplary weighted search representation of patent field processing in connection with the present invention.

Initially, a user-entered query is split into phrases/terms and the system finds synonyms and English equivalents for each phrase or term. The following are examples of scenarios of user query terms or component parts in which the method may be employed to enhance the search. The system may add or modify a user query with terms derived from one or more indexes comprised of linguistically or otherwise related terms. For example, the following may be indexes used by the system to enhance a user query: English equivalents for non-English terms indexes, e.g., Gefrierschrank (German) corresponds to Freezer, and Refrigerator (English) (refer to example of FIG. 7); abbreviations indexes, e.g., LED→LED, Light, Lamp; EKG→ECG, Electrocardiogram; alternative spelling variants indexes, e.g., Fertiliser→Fertilizer; and synonyms indexes, e.g., Notebook→Computer.

The next phase of Step 402 is to build or create a Fulltext Signature. This step may be, for example, performed by finding synonyms and English equivalents for each phrase or term. The system then adds or supplements the query with English equivalents for non-English terms, e.g., Gefrierschrank (German) corresponds to Freezer, and Refrigerator (English). A Fulltext Signature, e.g., for Query term="Gefrierschrank", may be represented as follows in the context of a document comprised of multiple fields, portions, sections, etc., with this example being in the context of a patent document. A query structured to provide an enhanced search for the query term "Gefrierschrank" would include the query components corresponding to fields or parts of a patent, e.g., [Title=(Gefrierschrank OR freezer OR refrigerator)] OR [Abstract=(Gefrierschrank OR freezer OR refrigerator)] OR [Claims=(Gefrierschrank OR freezer)] OR [Description=(Gefrierschrank OR freezer)]. Refer to example of FIG. 7.

The next phase, Step 404, is to build a Bibliographical Signature. First, the system runs the fulltext signature search that was constructed at Step 402. Next, the system reduces search results to one member per DWPI family. Next, the system prepares summaries for IPC, citations and other bibliographic fields. Next, the system constructs a bibliographic signature. Refer to example of FIG. 6.

The next phase involves Running the Search and Scoring the Results. First the system combines fulltext and bibliographic signature in one query 405. Next the system assigns weights to each component for best ranking Next the system runs the search 406, 408 and delivers scored search results 410.

The system's Semantic or Concept-based ("About These") Searching may be used to supplement or as an alternative to traditional Boolean implemented searching and provides for a concept-based or "about these" type searching function to improve results. The following further describes the exemplary concept-based search of FIG. 5 involving the terms "Stable" and "Tent", which may be input, e.g., by way of an "About these" user interface field or box or prompt 504 in which a user inputs the terms "stable tent." In this context "about" means that entered search terms need not themselves occur in the results. For example, up to ten dingle-word or multiword search terms are accepted in any one instance of the field and additional instances may be added. In operation, the fuzzy, "signature similar", about these search-form field may interact normally via Boolean operators with other search fields. In this way the inventive system provides a semantic expansion of the user-entered search terms. To further expand the reach of the search, cross-lingual techniques such as described elsewhere herein may be used to collect additional responsive documents having full length documents or portions of documents in languages other than the language of the initial search terms.

In addition, the search may be conducted entirely on the fly or in real time. In one exemplary manner, the semantic expression method includes four phases per "About these" field: amplify each search term into an OR-ed set; preliminary scored keyword search; derive bibliographic signature; final (for this field) scored search for matches on the bibliographic signature. The system may then combine as specified with all the other fields.

In one manner the system may employ multiple search techniques or structures to yield a set of results for further processing. For example, the concept-search may include a "Text fields" search processing the text string "stable tent" against records, indexes or documents in one or more database(s). While such a "Phrase search" delivers good targeted results, many results may be missing.

The concept-search may also include a Text fields search constructed as "stable AND tent" searching for two separate words that occur in any part of a record. In contrast to the prior search element, more results are delivered, but some relevant results are still missing. Also, a number of non-relevant results are added. For example, "tent" has different meanings, e.g., a portable shelter made of cloth; a plug of soft material for insertion into a bodily canal, one or more of which may be wholly irrelevant to the subject of interest of the user and the intended search. The concept-search may also include a Text fields search constructed as "stable AND tent" in conjunction with an "IPC" field search, e.g., IPC="E04H." In this example the system further limits the search of the above example by IPC field to focus search on "buildings or like structures, tents or canopies." The non-relevant results are still included. As shown in FIG. 5, the system provides a user interface 508 that serves as a search filter, including a class filter, and suggests or presents fields, such as IP Subclass list 510 and selection boxes or other means for a user to select a class or subclass, e.g., 512, 514, believed to be of interest in the search and likely to lead to relevant result set. Result set filters are enhanced; filter for class and subclass are added. This allows the system to split results based on area of technology. For example search "stable tent" returns results in two separate areas 512 (E04H—Buildings or like structures for particular purpose; . . . tents or canopies, in general) and 514 (A61K—Preparations for medical, dental, or toilet purpose . . . ).

The concept-search may also include search elements related to other fields. For example, the search may include searching by "Title/abstract" fields using the term "stable AND tent" and in conjunction with IPC field search for "E04H." In this example, the search uses other targeted text fields, in this case "title" field and "abstract" field instead of all "text" fields. In addition, the search may use weighting and/or may add synonyms of terms, etc. to further modify the search.

In keeping with the present invention, one methodology for assessing search quality is as follows: run traditional Boolean type search and collect results—Result Set #1; run "About these" type search and collect ranked results—Result Set #2; assign position number for each item in each Result Set—position numbering starts with 1 (if a found item appears in only one of Result Sets, the item will have position 0 with respect to Results Set in which it does not appear.); calculate aggregate measures of the difference between the Result Sets; produce a comparison table that is a combined list of patents from Result Set #1 and Result Set #2 sorted by relative difference, all as computed using vector analysis. Table 1 below illustrates an exemplary search quality assessment chart.

TABLE 7

| Patent Number | Position on Result Set #1 | Position on Result Set #2 | Relative difference |
|---|---|---|---|
| CN202139769U | 1 | 0 | 8.47887 |
| U.S. Pat. No. 8,387,643B2 | 2 | 0 | 7.78572 |
| U.S. Pat. No. 8,096,311B2 | 3 | 0 | 7.38026 |

In one further example of the methodology for assessing search quality, the Boolean search for the term "stable tent" yields just nine total matching records compared with the "About these" search that yields, e.g., 4,811 matching records. In comparison the Boolean search missed many relevant records of interest to the user.

TABLE 8

| Patent Number | DWPI Title |
|---|---|
| CN202139769U | Tent snowsweeper, has swing rod connected with bottom frame, where bottom frame is connected with frame that is provided with middle supporting wheel, and motor connected with bottom brush roller shaft joint |
| U.S. Pat. No. 8,387,643B2 | Self erecting tent comprises two resilient frame elements which cross at two positions adjacent to underside of tent, on either side of tent, with tent in erected position |
| KR1161621B1 | Tent pole connector has upper side connector which binds upper pawl connected to rubber band to upper side combining hole |
| KR1110554B1 | Multi-lockable tent pole connector, has buckle bonded to apertured combining hole, and concave waste paper covering part formed in buckle to cover outer circumference of tent pole bonded to hole |

The system may also include a search term suggestion feature to assist users in selecting terms effective in delivery of documents of interest. For example, the system may include a suggestion process having the following major steps: for each term or phrase, execute a search on all First Level Titles (that are available in different languages)(e.g., run patent search All_titles=(Search_Term)); collect all hits and extract titles from the result records (e.g., collect DWPI titles from the matching documents); split the titles into terms and phrases (pairs of words in our case); remove noise (e.g., "the", "an", etc.); summarize term based on their occurrences (weighting or taking into account frequencies in relation to the corpus); score terms and select the terms with highest scores; and present a set of suggested terms. See weighted occurrences of FIG. 6.

In one manner, the search expansion/query modifier invention overcomes undesired narrowing, with respect to intention, of search results from text-term search queries—due to particular choice of language, particular variant of terminology within the language, and particular grammatical form and spelling of terms from the terminology—in searching multi-fielded data, provided the data include fields that are content-correlated but language invariant. The method utilizes the language-invariant fields to amplify the original text-term search query. The text-term search query is submitted with a configurable low cap on the number of results to be fetched. The fetched results are analyzed in respect of their language-invariant, content-correlated fields, producing tallies of the occurrences of different values in those fields. The value tallies for those fields contribute to a "signature" of the content of interest to the user, as based on the sample obtained. Based on the signature the query is amplified. The tallies obtained are used to inform weighting of additional search criteria. For each of the most prevalent values—configurably defined—of the language-invariant fields, a search criterion is formulated to stipulate that the value be found in that field. The new criteria are appended to the original text-term search criteria with WOR as the connective and with weights determined by the tallies obtained from the sample in step (b). (Values occurring more frequently in the sample results of step (a) are given more weight in the criteria for the signature search than less frequently occurring values.) This amplification of the original query expresses to the search system the signature being sought, which signature may be identified in the corpus even in documents that do not satisfy the original text-term search criteria. The differential weights provided induce the search system to return results that are scored in good correlation with the user's interest. The results of the large WOR of disparate criteria are generally very numerous, trailing off in relevance to the user as they are brought in by only very few of the search criteria, with ever fewer match occurrences. The method cuts off the result by a combination of threshold considerations involving number of results and scores.

In operation, the above described methods may be combined as search criteria against a pseudo-field, which may be labeled "About these" or "Signature search" or "Signature Similar" or the like, in arbitrary Boolean combination with traditional search criteria against real fields. This affords the user free mixing of approaches within a single user interface. The user interacts with a search form with screen fields associated with ordinary data fields, but also with an "About these" screen field not associated precisely with actual data fields. The user is encouraged to enter terms characteristic of the area of interest in the "About these" screen field. The terms may be in any language with representation in the corpus data. The terms entered in the "About these" field are individually treated. The strongest suggestions are used in OR-combination with the respective entered terms, each amplified term set to be used in separate criteria against the different strata of text fields in the subsequent signature-deriving (below) and signature-using (below) searches. "Strongest", in cutoff for the series of suggested terms, is interpreted more strictly against the broader-field strata, more loosely against the narrower-field strata. The suggested-term-amplified text search criteria are used to obtain a sample result set. The results are analyzed for value frequencies in the chosen language-independent, content-correlated fields. Signature-search criteria are crafted and the signature search is run. The results of step (e) are then used in whatever Boolean combination the user has specified with results of other criteria collected in the search form.

With reference to FIG. 1A, the processes associated with the various aspects of the present invention may be carried out in conjunction with the combination of hardware and software and communications networking illustrated in the form of exemplary system 100. In this example, system 100 provides a framework for a network-based searching, retrieving, analyzing, and ranking electronic documents, e.g., patents, patent documents, research and other technical articles, financial documents, etc. System 100 may be used in conjunction with a system offering of a professional services provider, e.g., West Services Inc., Thomson Innovation, both a part of Thomson Reuters Corporation, and in this example includes a Central Network Server/Database Facility 101 comprising a Network Server 102, a Database electronic documents (e.g., patent database(s), Derwent DWPI service/database) referenced generally at 103, a Document Retrieval System "DRS" 104 having as components a Semantic Search Expansion Analyzer 105, a Search Enhancer module 106 (comprising term suggestion and query modifier modules), a Relevance Ranking Module 107, and a Cross-Lingual Module 108. The Central Facility 101 may be accessed by remote users 109, such as via a network 126, e.g., Internet. Aspects of the system 100 may be enabled using any combination of Internet or (World Wide) WEB-based, desktop-based, or application WEB-enabled components. The remote user system 109 in this example includes a GUI interface operated via a computer 110, such as a PC computer or the like, that may comprise a typical combination of hardware and software including, as shown in respect to computer 110, system memory 112, operating system 114, application programs 116, graphical user interface (GUI) 118, processor 120, and storage 122 which may contain electronic information 124 such as electronic documents.

The methods and systems of the present invention, described in detail hereafter, may be employed in providing remote users access to a searchable database(s). In particular, remote users 109 may search a document database(s) 103 using search queries based on terms of interest and processed via DRS 104 to retrieve and view documents of interest. Because the volume of documents contained in databases 103 is vast, the inventions described herein are directed to enhanced semantic search capabilities and include 1) term suggestion/query modification, 2) enhanced relevance ranking based on focus-spectrum search expansion component queries, and 3) cross-lingual searching capabilities. By employing one or more of these inventions DRS 104 delivers improved searching, scoring and ranking processes that facilitate an efficient and highly effective, and much improved, searching and retrieving operation.

Client-side application software may be stored on machine-readable medium and comprising instructions executed, for example, by the processor 120 of computer 110, and presentation of web-based user interface screens facilitate the interaction between user 109 and central system 101. The operating system 114 should be suitable for use with the system 101 and browser functionality. The configuration thus described in this example is one of many and is not limiting as to the invention. Central system 101 may include a network of servers, computers and databases, such as over a LAN, WLAN, Ethernet, token ring, FDDI ring or other communications network infrastructure. Software to perform functions associated with system 101 may include self-contained applications within a desktop or server or network environment.

Now with reference to FIG. 1B, an exemplary representation of one manner of implementation of Document Retrieval System DRS 104 illustrating inter-operation of remote or local search professional 109, e.g., at a workstation such as a PC machine 110, connected via the Internet, e.g., 126, with a facility having an application services level 101B-1, a search control services level 101B-2 and a generic search level 110B-3. The application services level 101B-1 includes a search-request UI manager 102B, a search-results UI manager 103B and a document-view UI manager 104B. The search-control services level includes a search federator 105B which serves as a traffic cop of sorts and assembles multiple queries into a set of results. Search federator 105B is in communication with multi-phase semantic expander 106B and specialized clause processors 107B. A cross-lingual search term suggester 108B communicates with the generic search services level 110B-3 and the application services level 110B-1search-request via search-request UI manager 102B. Generic search services level 101B-3 provides pattern and proximity matching, Boolean operations, and distribution-biased weighted OR services.

In operation of the focus-spectrum search expansion invention, an initial search clause is submitted, such as by user 109, and received at application services level 101B-1 to be acted upon by search-request UI manager 102B. At the search controller level, search federator 105B controls handles splitting up the initial search clause into a component series of focus-spectrum search expansion clauses or queries, e.g., dependent upon available fields, which are passed on for processing separately by generic search services facility 101B-3. The results of the searches conducted by generic search services facility 101B-3 are then passed up to the search-control services level for assembly by search federator 105B prior to presenting to user 109 via application services level 101B-1.

In alternative embodiments, the system shown in FIG. 1B may operate in a standalone manner or may be connected (e.g., networked) to other machines. In a networked deployment, the search handling facility may operate in the capacity of a server in server-client network environment, or as a peer machine in a peer-to-peer (or distributed) network environment. In addition, machine-readable medium employed in the various embodiments should be understood to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Combined Search Expansion/Relevance Ranking/Cross-Lingual System

Figure 3:
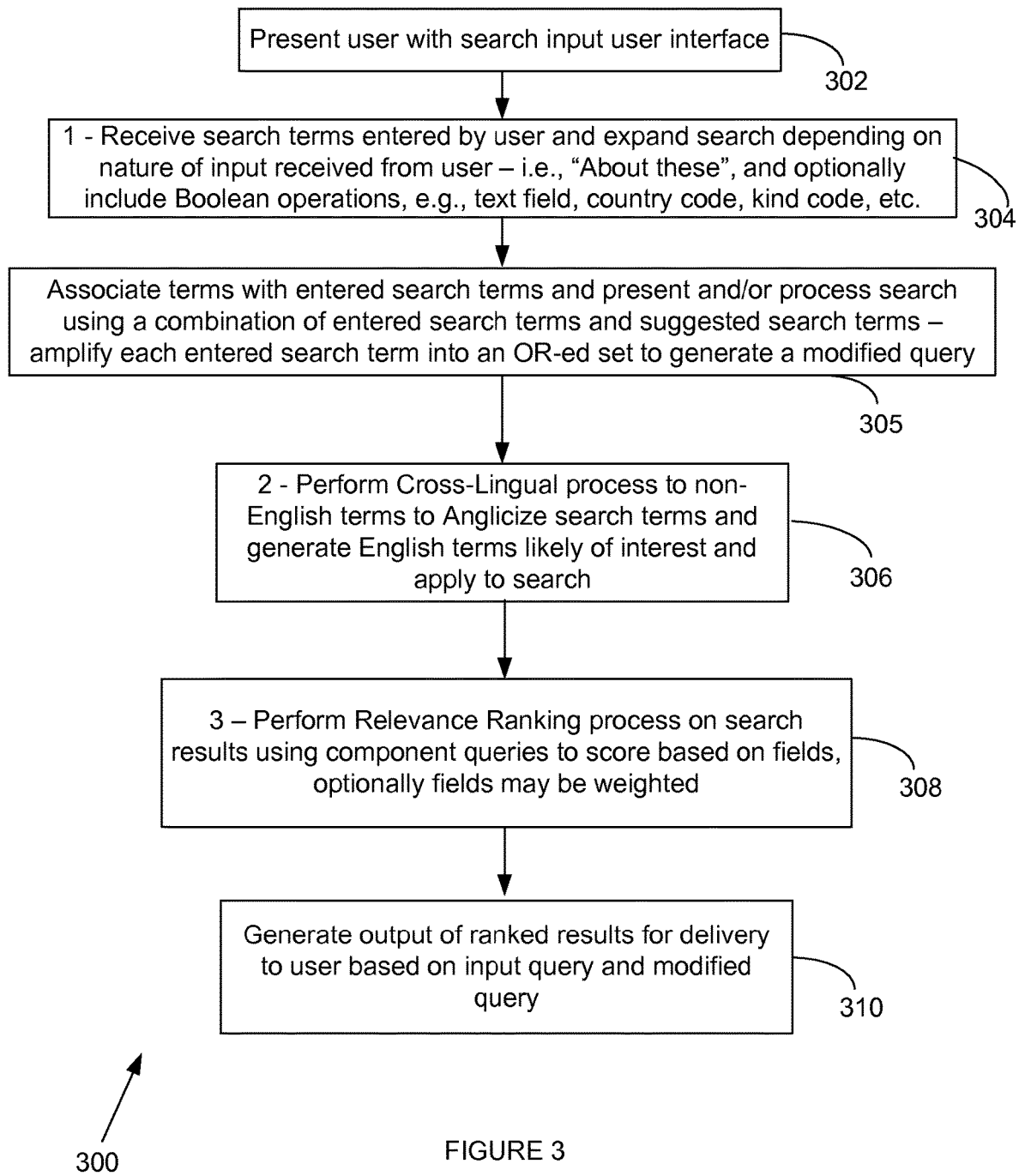
FIG. 3 is a search flow diagram illustrating an exemplary method of implementing a combined semantic search expansion/cross-lingual/relevance ranking system in accordance with combining the three subject inventions.

With reference to FIG. 3, an exemplary method 300 for combining semantic search expansion/modified query, cross-lingual, and relevance ranking techniques is shown that combines the three inventions described herein and operates, in this exemplary embodiment, as follows. At step 302 a user, such as user 109 operating a machine 110, is presented with a search input user interface. At step 304, a central system, such as system 104 of FIG. 1A, receives search terms entered by the user and expands or enhances the search depending on the nature of the input received from the user. For example, the user interface/search input screen may include one or more fields generally or specifically related to the type of search being performed or the nature of the documents contained in the database(s) being searched. For example, the user interface search input may be in the form of an "About these" field and the system takes an initial sample set of matching results, e.g., random 100 match documents, and derives suggested search terms based on the initial set of results. In addition, the system may further perform traditional Boolean processes on text field, country code field, kind code field, etc. In the context of the exemplary application of the invention in the context of patent searching, the search fields may include fields commonly associated with a patent document or search, e.g., title of patent, abstract, claims, detailed description, background, assignee, inventor, technical field, art class/subclass, etc. At step 305, the system 104 associates terms with entered search terms and present and/or process search using a combination of entered search terms and suggested search terms. For example, this step may include amplifying each entered search term into an OR-ed set to generate a modified query. In this manner the system will yield in addition to the initial set of matching results some set of documents that would lie outside the strict Boolean matching universe of documents. At step 306, system 104 performs a cross-lingual process on non-English terms to essentially Anglicize the terms and generate English terms likely to be of interest and to lead to documents of interest to the user. At step 308, system 104 performs the Relevance Ranking process on search results to rank the results using component queries. As described in detail herein, the relevance ranking invention may weight fields in a manner designed to focus the results and score the results to bring the most relevant documents to the top of the list when presented to the user. At step 310, the system 104 generates a signal representing the ranked results for delivery over a communications network, e.g., via network 126, to the remote user system, e.g., machine 110, to present the set of final results to the user 109. Each of the three inventions is described in more detail hereinbelow.

The present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

What is claimed is:

1. A computer-implemented method of improving the effectiveness of a text-search system so as to return documents relevant to a user's search request, implementable within a search controller or as an independent, auxiliary search-term suggestion service, accepting the user's input search term and generating and providing suggestions of alternate search terms based on analysis of a corpus of documents searchable by the text-search system, given the user's search term in a source language, the alternate search terms being in a target language, the target language being the same as or different from the source language, wherein the source language being different from the target language enabling cross-lingual searching in the corpus of documents by generating target-language alternate search terms that can be used to retrieve documents in the different target language via a generic text-search engine of the text-search system, the method comprising:
   a. operating as the independent search-term suggestion service or at the search-controller level mediating between a request function and the underlying generic text-search engine, and electronically receiving a query containing the user's search term in the source language;
   b. submitting the user's search term in the source language to the underlying generic text-search engine for matching against terms found in a set of predetermined source-language fields included in the corpus of documents, the source-language fields being determined for having, across the corpus of documents, a set of values in the source language that are short and keyword-rich relative to other fields in the corpus of documents, and returning a set of responsive documents based on the matching;
   c. statistically analyzing frequencies of the terms found in predetermined target-language fields of the responsive documents, the predetermined target-language fields being the same as or different from the predetermined source-language fields when the source language and the target language are the same, the target-language fields having been determined for having, likewise, across the corpus of documents, a set of values in the target language that are short and keyword-rich relative to other fields in the corpus of documents; and
   d. generating a ranked set of alternate search terms in the target language based on the frequencies of the terms found in the predetermined target-language fields of the responsive documents, the ranking being further informed by comparing the frequencies of the terms found in the predetermined target-language fields of the responsive documents with frequencies of the same waits in the same target-language fields in the corpus of documents as a whole, terms having a greater degree of frequency increase, based on the comparison, receiving higher ranking.

2. The method of claim 1, wherein one or both of the sets of short, keyword-rich source-language fields and target-language fields include a title, or an enhanced title, or an abstract, or a keywords field.

3. The method of claim 1, further comprising:
   presenting suggested search terms to a user via a user interface, and
   receiving the user's responses to the suggested search terms, the user's responses being a selection or deselection of the presented suggested search terms.

4. The method of claim 3, further comprising
   receiving, from the user, additional suggested search terms by iteratively performing the generating and the receiving, wherein a returned set of search terms from each iteration serves as seeds for solicitation of further search-term suggestions.

5. The method of claim 4, wherein the iterations of suggested search terms, each iteration being presented in its own panel of scored suggested search-term items, result in a cascade of suggestion panels.

6. The method of claim 3, further comprising:
a presenting the user interface to the user, the user interface enabling the user to indicate a particular search term embedded within a query that includes the user's input search term.

7. The method of claim 6, further comprising:
automatically replacing the indicated search term within the query that includes the user's input search term with a parenthesized OR of the suggested search terms finally selected by the user, after receiving a signal of completion of the selection/de-selection and approval for the replacement to proceed.

8. A non-transitory computer-readable medium having computer-readable instructions thereon for improving the effectiveness of a text-search system so as to return documents relevant to a user's search request, implementable within a search controller or as an independent, auxiliary search-term suggestion service, accepting the user's input search term and generating and providing suggestions of alternate search terms based on analysis of a corpus of documents searchable by the text-search system, given the user's search term in a source language, the alternate search terms being in a target language, the target language being the same as or different from the source language, wherein the source language being different from the target language enabling cross-lingual searching in the corpus of documents by generating target-language alternate search terms that can be used to retrieve documents in the different target language via a generic text-search engine of the text-search system, the method comprising:
  a. operating as the independent search-term suggestion service or at the search-controller level mediating between a request function and the underlying generic text-search engine, and electronically receiving a query containing the user's search term in the source language;
  b. submitting the user's search term in the source language to the underlying generic text-search engine for matching against terms found in a set of predetermined source-language fields included in the corpus of documents, the source-language fields being determined for having, across the corpus of documents, a set of values in the source language that are short and keyword-rich relative to other fields in the corpus of documents, and returning a set of responsive documents based on the matching:
  c. statistically analyzing frequencies of the terms found in predetermined target-language fields of the responsive documents, the predetermined target-language fields being the same as or different from the predetermined source-language fields when the source language and the target language are the same, the target-language fields having been determined for having, likewise, across the corpus of documents, a set of values in the target language that are short and keyword-rich relative to other fields in the corpus of documents; and
  d. generating a ranked set of alternate search terms in the target language based on the frequencies of the terms found in the predetermined target-language fields of the responsive documents, the ranking being further informed by comparing the frequencies of the terms found in the predetermined target-language fields of the responsive documents with frequencies of the same terms in the same target-language fields in the corpus of documents as a whole, terms having a greater degree of frequency increase, based on the comparison, receiving higher ranking.

9. The non-transitory computer-readable medium of claim 8, wherein one or both of the sets of short, keyword-rich source-language fields and target-language fields include a title, or an enhanced title, or an abstract, or a keywords field.

10. The non-transitory computer-readable medium of claim 8, further comprising:
presenting suggested search terms to a user via a user interface, and
receiving the user's responses to the suggested search terms, the user's responses being a selection or deselection of the presented suggested search terms.

11. The non-transitory computer-readable medium of claim 10, further comprising
receiving, from the user, additional suggested search terms by iteratively performing the generating and the receiving, wherein a returned set of search terms from each iteration serves as seeds for solicitation of further search-term suggestions.

12. The non-transitory computer-readable medium of claim 11, wherein the iterations of suggested search terms, each iteration being presented in its own panel of scored suggested search-term items, result in a cascade of suggestion panels.

13. The non-transitory computer-readable medium of claim 10, further comprising:
presenting the user interface to the user, the user interface enabling the user to indicate a particular search term embedded within a query that includes the user's input search term.

14. The non-transitory computer-readable medium of claim 13, further comprising:
automatically replacing the indicated search term within the query that includes the user's input search term with a parenthesized OR of the suggested search terms finally selected by the user, after receiving a signal of completion of the selection/de-selection and approval for the replacement to proceed.

15. A device for improving the effectiveness of a text-search system so as to return documents relevant to a user's search request, implementable via a search controller or as an independent, auxiliary search-term suggestion service, accepting the user's input search term and generating and providing suggestions of alternate search terms based on analysis of a corpus of documents searchable by the text-search system, given the user's search term in a source language, the alternate search terms being in a target language, the target language being the same as or different from the source language, wherein the source language being different from the target language enabling cross-lingual searching in the corpus of documents by generating target-language alternate search terms that can be used to retrieve documents in the different target language via a generic text-search engine of the text-search system, the device comprising:
  processing circuitry configured to
    a. operate as the independent search-term suggestion service or at the search-controller level mediating between a request function and the underlying generic text-search engine, and electronically receive a query containing the user's search term in the source language;
    b. submit the user's search term in the source language to the underlying generic text-search engine for matching against terms found in a set of predetermined source-language fields included in the corpus of documents, the source-language fields drawn being determined for having, across the corpus of documents, a set of values in the source language that are short and keyword-rich relative to other fields in the corpus of documents, and returning a set of responsive documents based on the matching:

c. statistically analyze frequencies of the terms found in predetermined target-language fields of the responsive documents, the predetermined target-language fields being the same as or different from the predetermined source-language fields when the source language and the target language are the same, the target-language fields having been determined for having, likewise, across the corpus of documents, a set of values in the target language that are short and keyword-rich relative to other fields in the corpus of documents; and d. generate a ranked set of alternate search terms in the target language based on the frequencies of the terms found in the predetermined target-language fields of the responsive documents, the ranking being further informed by comparing the frequencies of the terms found in the predetermined target-language fields of the responsive documents with frequencies of the same terms in the same target-language fields in the corpus of documents as a whole, terms having a greater degree of frequency increase, based on the comparison, receiving higher ranking.

16. The device of claim 15, wherein one or both of the sets of short, keyword-rich source-language fields and target-language fields include a title, or an enhanced title, or an abstract, or a keywords field.

17. The device of claim 15, wherein the processing circuitry is further configured to present suggested search terms to a user via a user interface, and receive the user's responses to the suggested search terms, the user's responses being a selection or deselection of the presented suggested search terms.

18. The device of claim 17, wherein the processing circuitry is further configured to receive, from the user, additional suggested search terms by iteratively performing the generate and the receive, wherein a returned set of search terms from each iteration serves as seeds for solicitation of further search-term suggestions.

19. The device of claim 18, wherein the iterations of suggested search terms, each iteration being presented in its own panel of scored suggested search-term items, result in a cascade of suggestion panels.

20. The device of claim 17, wherein the processing circuitry is further configured to present the user interface to the user, the user interface enabling the user to indicate a particular search term embedded within a query that includes the user's input search term.

21. The device of claim 20, wherein the processing circuitry is further configured to automatically replace the indicated search term within the query that includes the user's input search term with a parenthesized OR of the suggested terms finally selected by the user, after receiving a signal of completion of the selection/de-selection and approval for the replacement to proceed.

* * * * *